(12) United States Patent
Nishi

(10) Patent No.: US 6,700,842 B1
(45) Date of Patent: Mar. 2, 2004

(54) OPTICAL HEAD, PHOTODETECTOR, OPTICAL INFORMATION RECORDING AND REPRODUCING APPARATUS AND FOCUS ERROR DETECTING METHOD

(75) Inventor: Noriaki Nishi, Tokyo (JP)

(73) Assignee: Sony Corporation, Tokyo (JP)

( * ) Notice: Subject to any disclaimer, the term of this patent is extended or adjusted under 35 U.S.C. 154(b) by 233 days.

(21) Appl. No.: 09/671,103

(22) Filed: Sep. 27, 2000

(30) Foreign Application Priority Data

Sep. 29, 1999 (JP) .......................................... 11-277544

(51) Int. Cl.$^7$ ................................................. G11B 7/00
(52) U.S. Cl. .............................. 369/44.41; 369/53.22; 369/53.35; 369/124.12
(58) Field of Search ............................. 369/44.41, 59.1, 369/44.23, 44.13, 44.29, 44.35, 53.22, 53.35, 124.12

(56) References Cited

U.S. PATENT DOCUMENTS

| | | | | |
|---|---|---|---|---|
| 5,243,585 A | * | 9/1993 | Hoshino et al. | 369/44.41 |
| 5,615,185 A | * | 3/1997 | Horikiri | 369/44.13 |
| 5,798,989 A | * | 8/1998 | Shodo | 369/44.41 |
| 5,930,220 A | * | 7/1999 | Shimano et al. | 369/44.23 |
| 6,167,017 A | * | 12/2000 | Higashiura et al. | 369/44.23 |
| 6,181,657 B1 | * | 1/2001 | Kuroda et al. | 369/59.1 |
| 6,353,583 B1 | * | 3/2002 | Kudoh et al. | 369/44.41 |
| 6,418,098 B1 | * | 7/2002 | Yamamoto et al. | 369/44.41 |

* cited by examiner

Primary Examiner—William Korzuch
Assistant Examiner—Kim-Kwok Chu
(74) Attorney, Agent, or Firm—Frommer Lawrence & Haug LLP; William S. Frommer; Bruno Polito

(57) ABSTRACT

Disclosed are an optical head, a photodetector, an optical recording and reproducing apparatus and a focus error detecting method, which can be adapted to a plurality of kinds of recording media and a land/groove recording system. A photoreceiving part for the main spot in a photodetector in an optical head is divided into a plurality of parts. An intermediate photoreceiving part consisting of four small photoreceiving parts is provided in a central area surrounded by four peripheral photoreceiving parts. Without using an output signal from the intermediate photoreceiving part positioning in an area where the intensity distribution is unstable in a converged light spot, a focus error signal is obtained only from output signals from the peripheral photoreceiving parts and a focusing control is performed by using the focus error signal. While maintaining compatibility by constructing the other parts of the optical head except for the photodetector in a manner similar to the case of the conventional astigmatism method, an excellent focusing control which does not cause much track crossing noise can be performed also on a land/groove recording medium.

13 Claims, 20 Drawing Sheets

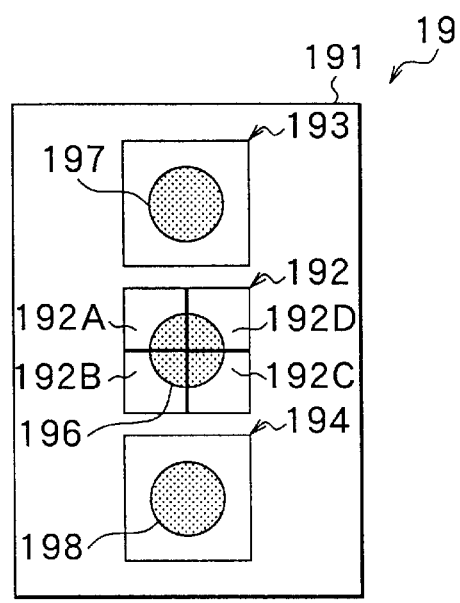
FIG.1
RELATED ART
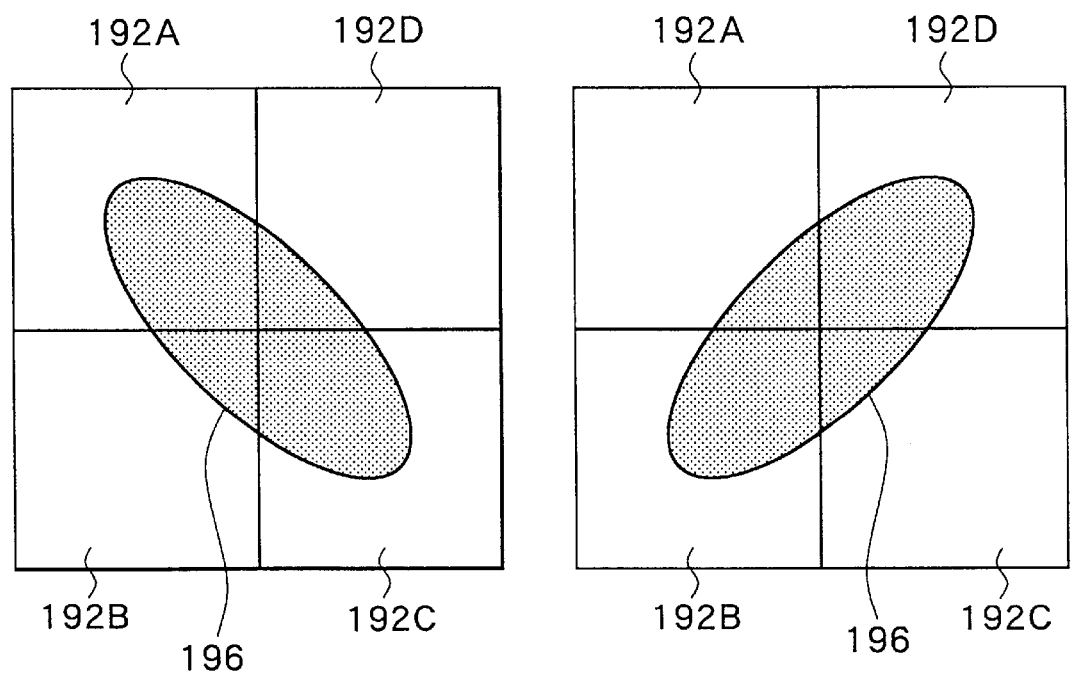
FIG.2A
RELATED ART
FIG.2B
RELATED ART

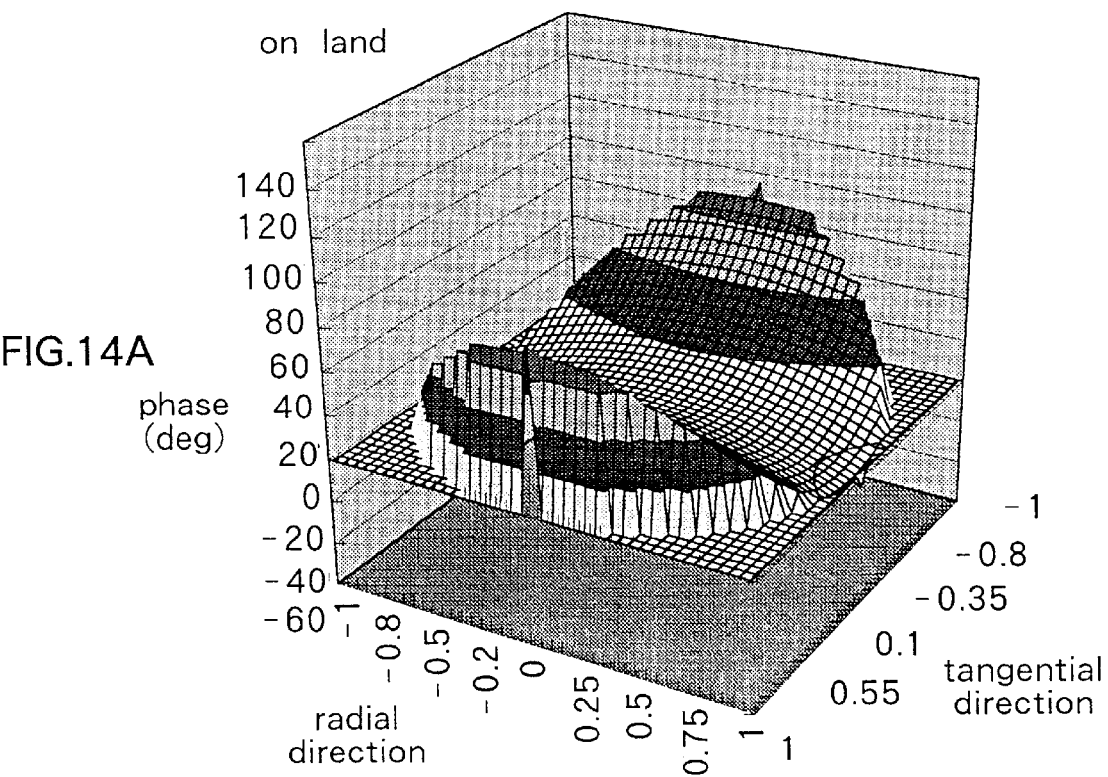
FIG.14A on land
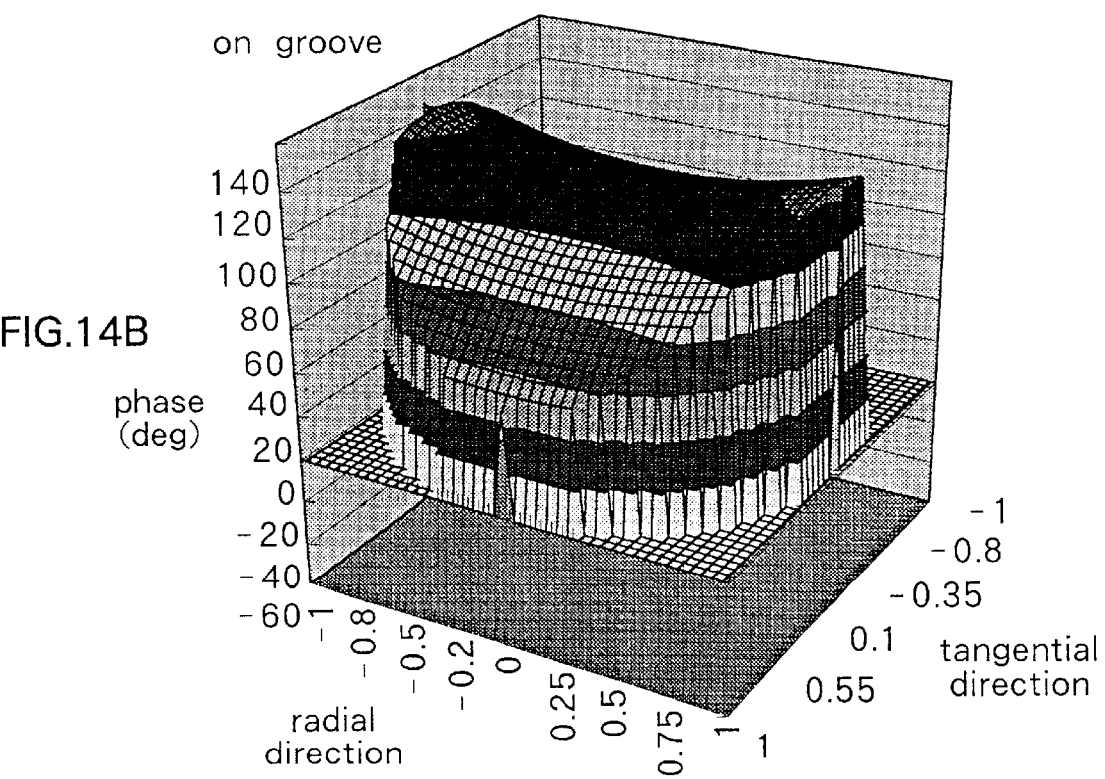
FIG.14B on groove

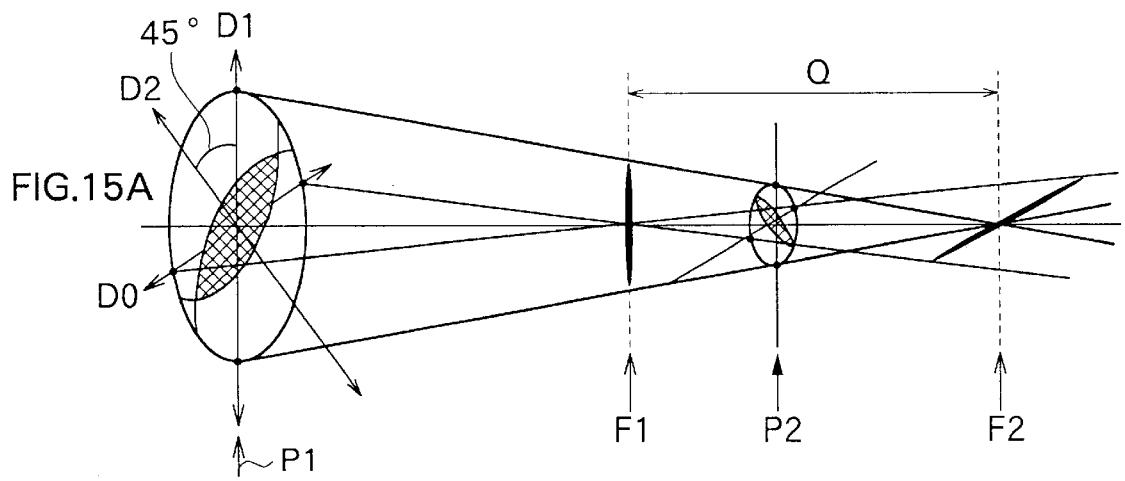
FIG.15A
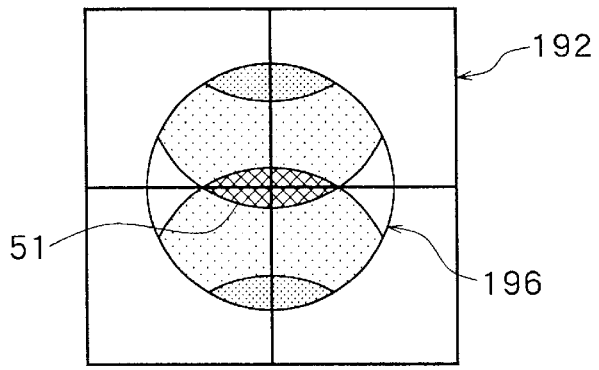
FIG.15B
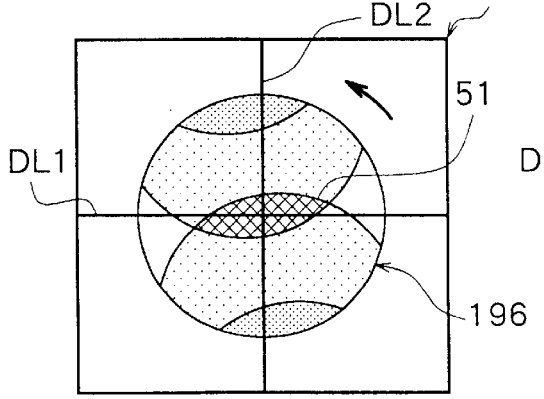 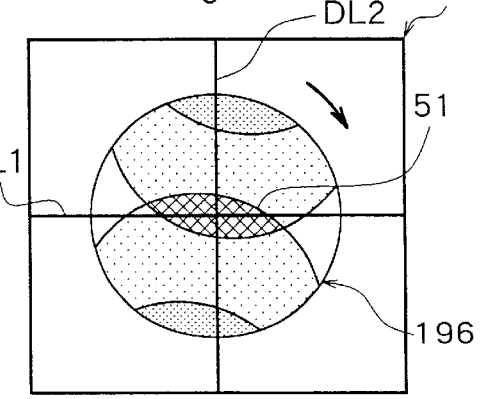
FIG.16A          FIG.16B on land on groove

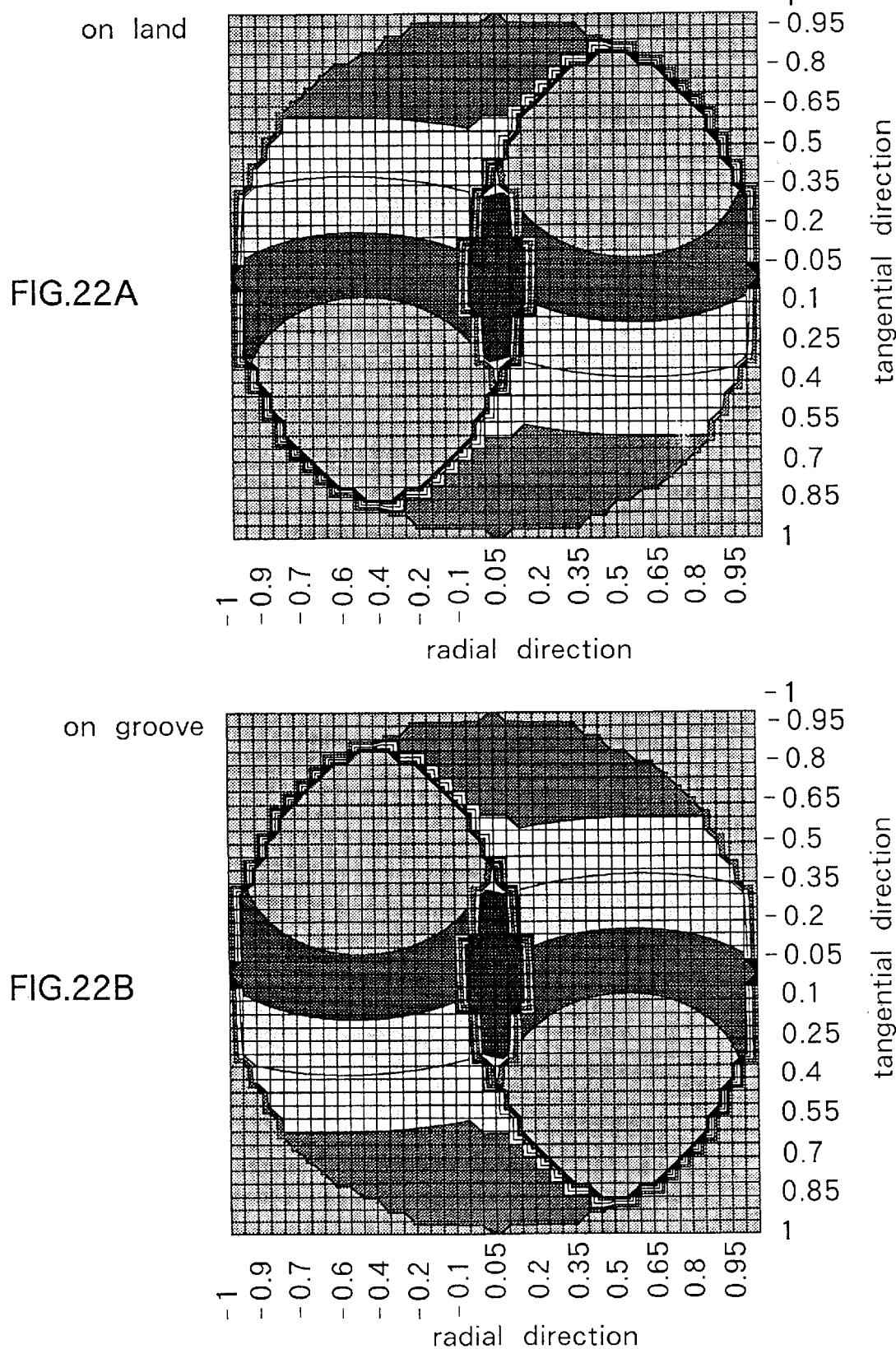

on land on groove

OPTICAL HEAD, PHOTODETECTOR, OPTICAL INFORMATION RECORDING AND REPRODUCING APPARATUS AND FOCUS ERROR DETECTING METHOD

BACKGROUND OF THE INVENTION

1. Field of the Invention

The present invention relates to an optical head used for at least either recording or reproducing information by light to/from a recording medium, an optical information recording and reproducing apparatus configured by using such an optical head, and a focus error detecting method for detecting a focus error of light condensed onto a recording medium.

2. Description of the Related Art

In recent years, various optical information recording and reproducing apparatuses for at least either optically recording or optically reproducing information by using an optical information recording medium such as an optical disk have been being commercially available. Among them, an optical disk drive using an optical disk as a recording medium has been remarkably spread and its recording density is becoming higher and higher. As a playback-only optical disk drive, for example, a DVD drive capable of reproducing a DVD of which recording capacity has been increased to 4.7 GB that is about 7 times as large as that of a CD-ROM (Compact Disk-Read Only Memory) is already commercially available. The DVD has the same size (diameter of 120 mm) as a CD-ROM having a recording capacity of about 650 MB.

Generally, in an optical disk, a recording surface is formed on a transparent substrate and light for recording or reproducing emitted to an optical disk via an objective lens passes through the transparent substrate and is condensed on the recording surface. For example, a DVD drive adopts a differential phase difference method (DPD method) using a photodetector which is divided into four parts by a cross lattice. On the other hand, in order to minimize a beam spot on the recording surface, focusing error detection is performed. As the detection method, an astigmatism method, in which the same photodetector as that used for the tracking error detection is usable, is often employed.

In a CD drive, the NA (Numerical Aperture) of an objective lens is set to 0.45. In a DVD drive, in order to make the recording density higher, the NA of the objective lens is increased to 0.60. When the NA is increased, generally, aberration (mainly, coma aberration) in the case where a disk is tilted increases and a reproduction signal is degraded. Since the aberration is usually almost proportional to the cube of the NA and the thickness of the substrate, in the DVD, in order to suppress the aberration, the thickness of a disk is set to 0.6 mm which is the half of that of a CD (=1.2 mm).

The DVD is expected as an optical disk which succeeds the CD. It is desired that the DVD drive is usable for reproducing information from a CD. In the case of reproducing a CD by an optical system including an objective lens optimized for reproducing a DVD of a higher density, spherical aberration occurs due to different thickness of the substrate. A good reproduction signal cannot be therefore obtained.

Under present circumstances, the DVD drive is further expected to reproduce also a CD-R (CD recordable) as a write-once CD. The CD-R is, however, usually made of materials including a coloring agent sensitive to light of a relatively long wavelength. Consequently, it is difficult to reproduce a CD-R by using a light source which emits light of 650 nm used in the DVD drive. In each of a DVD-ROM reproducing apparatus and a DVD-Video reproducing apparatus which can reproduce a CD-R as well, two kinds of light sources of a light source for emitting light of 650 nm and a light source for emitting light of 780 nm are used and an optical head (optical pickup) devised to suppress also signal degradation caused by different substrate thickness is adopted. An optical head for use in the DVD-ROM apparatus capable of reproducing not only a DVD-ROM but also a CD and a CD-R will be described hereinbelow. In the following description, a CD and a CD-R will be simply described as a CD, and a DVD-ROM and a DVD-Video will be simply described as a DVD.

FIG. 1 is a plan view showing the structure of a photodetector used for an optical head of a DVD apparatus capable of reproducing both a DVD and a CD.

First, the photodetector will be described. As shown in FIG. 1, a photodetector 19 comprises: a substrate 191; a photoreceiving part 192 for a main spot disposed in the central region of the substrate 191; and two photoreceiving parts 193 and 194 for side spots disposed at equal intervals on both sides of the photoreceiving part 192 for the main spot. The photoreceiving part 192 for the main spot has a rectangular shape as a whole and is divided in four photoreceiving regions 192A, 192B, 192C and 192D of almost the same shape by dividing lines of a cross. Each of the photoreceiving parts 193 and 194 for side spots is a single region which is not divided.

At the time of reproducing a CD, a light beam emitted from the light source for a CD (not shown) is split into three beams by a diffracting optical system (not shown). The three beams are condensed by an objective lens onto the recording surface of the CD as a recording medium. As shown in FIG. 1, the three light beams reflected by the recording surface of the CD enter the center areas of the photoreceiving part 192 for the main spot and the photoreceiving parts 193 and 194 for side spots in the photodetector 19 and form beam spots 196, 197 and 198, respectively.

On the other hand, at the time of reproducing a DVD, a light beam emitted from a light source for DVD (not shown) is condensed by the objective lens onto the recording surface of a DVD as a recording medium. The light beam reflected by the recording surface of the DVD passes through a predetermined optical system, is incident on the central area of the photoreceiving part 192 for the main spot in the photodetector 19, and forms the beam spot 196. The center of the beam spot 196 is adjusted to almost coincide with the center of the photoreceiving part 192 for the main spot (that is, the intersecting point of the four photoreceiving regions 192A, 192B, 192C and 192D). FIG. 1 shows the case where the beam spot 196 on the photoreceiving part 192 for the main spot has an almost circle shape, that is, the optical head is in the focusing state. The focusing state denotes a state where a light beam is focused by the objective lens to form the minimum spot on the recording surface of the recording medium. When the optical head goes out of focus, the beam spot 196 of the photoreceiving part 192 for the main spot changes its shape to either an oval shape having the major axis whose upper part is inclined to the left from the vertical line by 45 degrees and whose lower part is inclined to the right from the vertical line by 45 degrees as shown in FIG. 2A or an oval shape having the major axis whose upper part is inclined to the right from the vertical line by 45 degrees and whose lower part is inclined to the left from the vertical line by 45 degrees as shown in FIG. 2B. Each of FIGS. 2A and 2B enlargedly shows only the photoreceiving part 192 for the main spot in the photodetector 19.

When photoreception signals which go out from the four photoreceiving regions 192A, 192B, 192C and 192D of the photoreceiving part 192 for the main spot are designated by reference characters a, b, c and d, respectively, and photoreception signals which go out from the photoreceiving parts 193 and 194 for side spots are designated by reference characters e and f, respectively, a focus pull-in signal FPI, a reproduction signal RF, a focus error signal FE, and a tracking error signal TE are expressed by the following equations (1) to (4). The focus pull-in signal FPI is a signal used to regulate a range in which a focusing control is performed on the basis of the focus error signal FE and is obtained by, for example, eliminating high frequency components of the reproduction signal RF by using a predetermined low pass filter (not shown).

$$\text{focus pull-in signal FPI=reproduction signal RF}=a+b+c+d \quad (1)$$

$$\text{focus error signal FE}=(a+c)-(b+d) \quad (2)$$

$$\text{tracking error signal TE=phase difference between } (a+c) \text{ and } (b+d) \quad (3)$$

or $$\text{tracking error signal TE}=e-f \quad (4)$$

The focus error signal FE expressed by the equation (2) is used for detecting a focus error by the astigmatism method. As described above, at the time of reproducing information from a DVD, in the photodetector 19 shown in FIG. 1, the shape of the beam spot 196 on the photoreceiving part 192 for the main spot becomes a circle or various ovals whose major axes are oriented differently in accordance with the degree of focusing. The focus error signal FE obtained by the equation (2) varies accordingly. More specifically, in the focusing state, output signals from the photoreceiving regions 192A, 192B, 192C and 192D of the photoreceiving part 192 for the main spot are almost equal to each other. Consequently, the focus error signal FE is almost zero. When the system is out of focus, the beam spot 196 has an oval shape. A difference therefore occurs between the sum (a+c) of the output signals from the photoreceiving regions 192A and 192C in one of diagonal line directions in the photoreceiving part 192 for the main spot and the sum (b+d) of output signals from the photoreceiving regions 192B and 192D in the other diagonal line direction. In this case, the sign of the difference between them depends on the direction of defocusing and the absolute value of the difference depends on the amount of defocusing. By moving the objective lens so that the focus error signal FE becomes zero, the best focusing state is maintained.

The method of tracking servo in the case of reproducing a DVD and that in the case of reproducing a CD are different from each other. Specifically, in the case of reproducing a DVD, a phase difference between (a+c) and (b+d) expressed by the equation (3) is obtained by using the signals which go out from the photoreceiving regions 192A, 192B, 192C and 192D of the central photoreceiving part 192 for the main spot used in the astigmatism method for focus servo. The phase difference is used as a tracking error signal TE. On the other hand, in the case of reproducing a CD, tracking servo is performed by the so-called three-spot method. According to the three-spot method, light to be applied on a disk is split into three light beams of the 0 order ray, +primary ray, and −primary ray by a diffraction grating or the like. The three light beams are received by the three receiving parts of the receiving part 192 for the main spot and the receiving parts 193 and 194 for the side spots. As a tracking error signal TE, (e−f) expressed by the equation (4) is used.

The objective lens used for such an optical head has, for example, the structure as shown in FIG. 6. FIG. 6 shows, for convenience of explanation, a cross section of a CD in the right half and a cross section of a DVD in the left half. As shown in the diagram, in a region having the NA of about 0.38 to 0.44, an objective lens 27 has a zonal substrate thickness correcting part 27A which is recessed from the surrounding area. A central region 27B on the inside of the substrate thickness correcting part 27A and a peripheral region 27C on the outside of the substrate thickness correcting part 27A are formed in a surface shape optimum to the thickness (0.6 mm) of the substrate of a DVD-ROM. On the other hand, the substrate thickness correcting part 27A is designed so as to be in a surface shape optimum to the thickness (1.2 mm) of the substrate of a CD, thereby enabling aberration which occurs at the time of reproducing the CD to be corrected. The objective lens 27 of such a structure is driven in the direction which is orthogonal to the disk face by an actuator having a coil for driving the lens (not shown).

The wavefront aberration in the case of reproducing a CD by using the objective lens 27 of FIG. 6 is, for example, as shown in FIG. 7. In the diagram, the lateral axis indicates the NA of the objective lens and the vertical axis represents the spherical aberration (unit: mm). As shown in the diagram, the wavefront aberration in the case of reproducing a CD with the objective lens 27 is reduced to a degree that there is no problem in practical use by synthesis of a paraxial region where the spherical aberration is relatively small and a zonal region (substrate thickness correcting part 27A) designed for a CD. Since the spherical aberration is large in the peripheral part having the NA of 0.44 or larger, light is diffused and is not incident on the photoreceiving part 192 for the main spot (FIG. 1) of a small size which is usually used for detecting a focus error by the astigmatism method.

On the other hand, in the event of reproducing a DVD, light which passes the zonal region (substrate thickness correcting part 27A) is diffused and does not converge to the photoreceiving part 192 for the main spot. Consequently, an optical system having high compatibility capable of reproducing both a CD and a DVD by using a single objective lens and a single detecting device can be realized without hardly deteriorating the performance of reproducing a DVD. As a result, a simple-structured low-cost optical head for DVD, CD and CD-R, which has a small number of parts can be realized.

Recently, however, in addition to the above-described recording media, a rewritable DVD-RAM (Random Access Memory) has been put to a commercial use. A reproduction head for DVD which can reproduce also the DVD-RAM and a recording/reproducing optical head for DVD-RAM which can also reproduce the DVD and CD have come to be demanded.

A conventional reproduction-only DVD or CD employs the system of recording information on either a land or a groove. A DVD-RAM capable of recording and reproducing information employs a land/groove recording system for recording information on both lands and grooves in order to increase the recording density. Different from a conventional DVD or CD in which either the land or groove used for recording is widened and the other is narrowed, in the land/groove recording system, both of the land and the groove are designed to be wide to a certain degree.

In the land/groove recording system, however, in the case of detecting a focus error by using the astigmatism method, a phenomenon called "tracking interference" which will be described hereinlater occurs. It has been confirmed that a noise called "track crossing noise" is caused by the phenomenon. The "tracking interference" is a phenomenon such that a large change occurs in the focus error signal when a beam spot crosses a track. The "track crossing noise" is a noise caused by variations in the value of the focus error signal which occur depending on whether the beam spot is on a land or a groove in a recording medium.

FIG. 3 shows the "tracking interference" phenomenon. In the diagram, the lateral axis shows the objective lens position in the direction which is orthogonal to a disk and the vertical axis indicates the output level of the focus error signal. A solid-line curve FEL is a focus error curve showing the relation between the objective lens position and the focus error signal FE in the case where the beam spot is on a land. A broken-line curve FEG is a focus error curve showing the relation between the objective lens position and the focus error signal FE in the case where the beam spot is on a groove.

As shown in the diagram, a range between the peaks of the focus error curve FEL (FEG) is specified as a focus pull-in range SPP. The focus servo is performed only in the range. The reason why the focus pull-in range SPP is provided and the focus servo is performed only in the range is that the focus error signal FE may become zero also in the case where the position of the objective lens is largely deviated from the focus position and it is necessary to eliminate the case where such a defocusing state is detected as a focusing state.

As shown in FIG. 3, depending on whether the beam spot is on the land or groove in the recording medium, the value of the focus error signal FE in the focus pull-in range SPP varies. Consequently, there are two positions at which the focus error signal FE becomes zero; an objective lens position $X_L$ in the case where the beam spot is on a land, and an objective lens position $X_G$ in the case where the beam spot is on a groove. On the other hand, a controller (not shown) for controlling the operation of the optical head controls a current passed to the coil for driving the lens (not shown) to drive the objective lens in the direction orthogonal to the disk so that the focus error signal FE becomes zero. Each time the beam spot moves from a land to a groove and from a groove to a land, the objective lens moves between the position $X_L$ and the position $X_G$, and it appears as the track crossing noise. The noise causes inconveniences such as defocusing, deterioration in transmission characteristics in the focus servo and tracking servo, and burning or breakage of the coil for driving a lens. The mechanism of causing the tracking interference phenomenon explained by referring to FIG. 3 has not been fully analyzed.

In order to avoid the inconveniences caused by the track crossing noise, it can be considered to perform focus error detection by using what is called a spot size method. According to the astigmatism method as described above, the divided photoreceiving part 192 for the main spot (FIG. 1) is used and output signals from the divided regions are diagonally added and subtracted on the basis of the equation (2), thereby obtaining signals corresponding to the shape of the photoreceiving spot. In contrast, according to the spot size method, the spot size is detected from the output signals from the photoreceiving part and the focusing control is performed according to the spot size.

In the spot size method, however, since the photoreceiving part for the main spot having a relatively large photoreceiving area is necessary, it is accompanied by the following inconveniences. Specifically, as described above, in the case of performing the focus error detection in accordance with the spot size method by using the objective lens 27 (FIG. 6) having the zonal substrate thickness correcting part 27A to realize the low-cost optical head by sharing the objective lens and the photoreceiving part, since the photoreceiving part for the main spot is too large, diffusion light which has passed the peripheral region 27C is received by the photoreceiving part for the main spot at the time of reproducing a CD. On the other hand, at the time of reproducing a DVD, diffusion light which has passed the zonal substrate thickness correcting part 27A is received by the photoreceiving part for the main spot. Consequently, at the time of reproducing the CD or DVD, the reproduction signal RF is degraded and a servo signal such as a focus error signal is also degraded.

SUMMARY OF THE INVENTION

The invention has been achieved in consideration of the above problems and its object is to provide an optical head, a photodetector, an optical recording and reproducing apparatus and a focus error detecting method which can be adapted to a plurality of kinds of recording media and also to a land/groove recording system in which both lands and grooves are used as information recording regions.

According to the invention, there is provided an optical head comprising: a light source for emitting a light beam; an objective lens for condensing the light beam emitted from the light source onto a recording surface of a recording medium having a predetermined track guiding structure; light splitting means for splitting the light beam emitted from the light source and a light beam reflected by the recording surface of the recording medium from each other; photodetecting means for receiving the light beam reflected by the recording medium and split by the light splitting means; and astigmatism causing means for causing astigmatism in the light beam reflected by the recording surface of the recording medium and coming to the photodetecting means via the light splitting means, wherein the photodetecting means includes: four peripheral photoreceiving parts which are almost symmetrically arranged with respect to a first axis parallel to an arrangement direction of a plurality of diffraction patterns generated by the track guiding structure of the recording medium and a second axis perpendicular to the arrangement direction; and an intermediate photoreceiving part disposed in an intermediate region sandwiched by two arrangement lines parallel to the second axis in the arrangement of the four peripheral photoreceiving parts.

According to the invention, there is provided a photodetector for detecting a focus error which occurs when a light beam emitted from a light source is condensed on a recording medium having a predetermined track guiding structure by an objective lens, comprising: four peripheral photoreceiving parts which are almost symmetrically arranged with respect to a first axis which is parallel to an arrangement direction of a plurality of diffraction patterns which are generated by the track guiding structure of the recording medium and a second axis which is perpendicular to the arrangement direction; an intermediate photoreceiving part which is disposed in an intermediate region sandwiched by two arrangement lines parallel to the second axis in the arrangement of the four peripheral photoreceiving parts; an input terminal for inputting a switching signal; and switching means for switching output signals from the four peripheral photoreceiving parts and the intermediate photoreceiving part in response to the switching signal supplied from the input terminal.

According to the invention, there is provided an optical information recording and reproducing apparatus comprising: recording medium driving means for driving a recording medium; an optical head for reading a signal from the recording medium driven by the recording medium driving means; optical head driving means for moving the optical head along the recording medium; signal processing means for generating a reproduction signal on the basis of the signal read by the optical head; and servo control means for controlling operations of the recording medium driving means, the optical head driving means and the optical head on the basis of the signal read by the optical head, wherein the optical head has: a light source for emitting a light beam; an objective lens for condensing the light beam emitted from the light source onto a recording surface of a recording medium having a predetermined track guiding structure; light splitting means for splitting the light beam emitted from the light source and a light beam reflected by the recording surface of the recording medium from each other; photodetecting means for receiving the light beam reflected by the recording medium and split by the light splitting means, which has four peripheral photoreceiving parts almost symmetrically arranged with respect to a first axis parallel to an arrangement direction of a plurality of diffraction patterns generated by the track guiding structure of the recording medium and a second axis perpendicular to the arrangement direction, and an intermediate photoreceiving part disposed in an intermediate region sandwiched by two arrangement lines parallel to the second axis in the arrangement of the four peripheral photoreceiving parts; and astigmatism causing means for causing astigmatism in the light beam reflected by the recording surface of the recording medium and coming to the photodetecting means via the light splitting means.

According to the invention, there is provided a focus error detecting method used for an optical head having: a light source for emitting a light beam; an objective lens for condensing the light beam emitted from the light source onto a recording surface of a recording medium having a predetermined track guiding structure; light splitting means for splitting the light beam emitted from the light source and a light beam reflected by the recording surface of the recording medium from each other; photodetecting means for receiving the light beam reflected by the recording medium and split by the light splitting means; and astigmatism causing means for causing astigmatism in the light beam reflected by the recording surface of the recording medium and coming to the photodetecting means via the light splitting means, wherein the photodetecting means is equipped with: four peripheral photoreceiving parts which are almost symmetrically arranged with respect to a first axis parallel to an arrangement direction of a plurality of diffraction patterns generated by the track guiding structure of the recording medium and a second axis perpendicular to the arrangement direction; and an intermediate photoreceiving part disposed in an intermediate region sandwiched by two arrangement lines parallel to the second axis in the arrangement of the four peripheral photoreceiving parts, and a focus error signal is obtained by adding a detection signal obtained on the basis of signals outputted from the four peripheral photoreceiving parts and constant times of a detection signal obtained on the basis of signals outputted from the intermediate photoreceiving part. In this case, a constant in constant times may be not only a positive number but also a negative number and further zero.

In the optical head or the optical information recording and reproducing apparatus of the invention, the light beam emitted from the light source is focused on the recording surface of the recording medium having a predetermined track guiding structure by the objective lens and reflected by the recording surface. The light beam reflected by the recording surface of the recording medium is split from the light beam emitted from the light source by the light splitting means and comes onto the photodetecting means. At that time, astigmatism is given by the astigmatism causing means to the light beam from the recording surface of the recording medium. The photodetecting means includes: the four peripheral photoreceiving parts which are almost symmetrically arranged with respect to a first axis parallel to an arrangement direction of a plurality of diffraction patterns and a second axis perpendicular to the arrangement direction; and an intermediate photoreceiving part disposed in an intermediate region sandwiched by two arrangement lines parallel to the second axis in the arrangement of the four peripheral photoreceiving parts. The four peripheral photoreceiving parts and the intermediate photoreceiving part are irradiated with a light beam spot.

In the photodetector of the invention, output signals from the four peripheral photoreceiving parts which are almost symmetrically disposed with respect to the first and second axes and an output signal from the intermediate photoreceiving part disposed in the intermediate region sandwiched by two arrangement lines parallel to the second axis in the arrangement of the four peripheral photoreceiving parts are switched in response to the switching signal supplied from the input terminal. On the basis of the output signals, a focus error which occurs when a light beam emitted from the light source is condensed onto a recording medium having the predetermined track guiding structure by the objective lens is detected.

In the focus error detecting method of the invention, first, the photodetecting means is equipped with: the four peripheral photoreceiving parts which are almost symmetrically arranged with respect to the first axis parallel to an arrangement direction of a plurality of diffraction patterns generated by the track guiding structure of the recording medium and the second axis perpendicular to the arrangement direction; and the intermediate photoreceiving part disposed in an intermediate region sandwiched by two arrangement lines parallel to the second axis in the arrangement of the four peripheral photoreceiving parts. Then, a focus error signal is obtained by adding a detection signal obtained on the basis of signals outputted from the four peripheral photoreceiving parts and constant times of a detection signal obtained on the basis of signals outputted from the intermediate photoreceiving part.

BRIEF DESCRIPTION OF THE DRAWINGS

These and other objects and features of the present invention will become clear from the following description of the preferred embodiments given with reference to the accompanying drawings, in which:

FIG. 1 is a plan view showing the construction of a photoreceiving part in a photodetector used in an optical head according to a related art.

FIGS. 2A and 2B are diagrams for explaining an action of the photodetector shown in FIG. 1.

FIGS. 14A and 14B are graphs showing another example of calculation of a phase distribution on the pupil of an objective lens of disk diffraction light in the case of reproducing a DVD-RAM by an optical head for DVD having no astigmatism.

FIGS. 15A and 15B are diagrams for explaining the state of a change in a spot in the astigmatism method.

FIGS. 16A and 16B are diagrams showing an example of a diffraction pattern on the photoreceiving part in the case of reproducing a land/groove recording medium by using the astigmatism method.

FIGS. 22A and 22B are graphs showing the intensity distribution in FIGS. 21A and 21B by using contour lines.

DETAILED DESCRIPTION OF THE PREFERRED EMBODIMENTS

Figure 3:
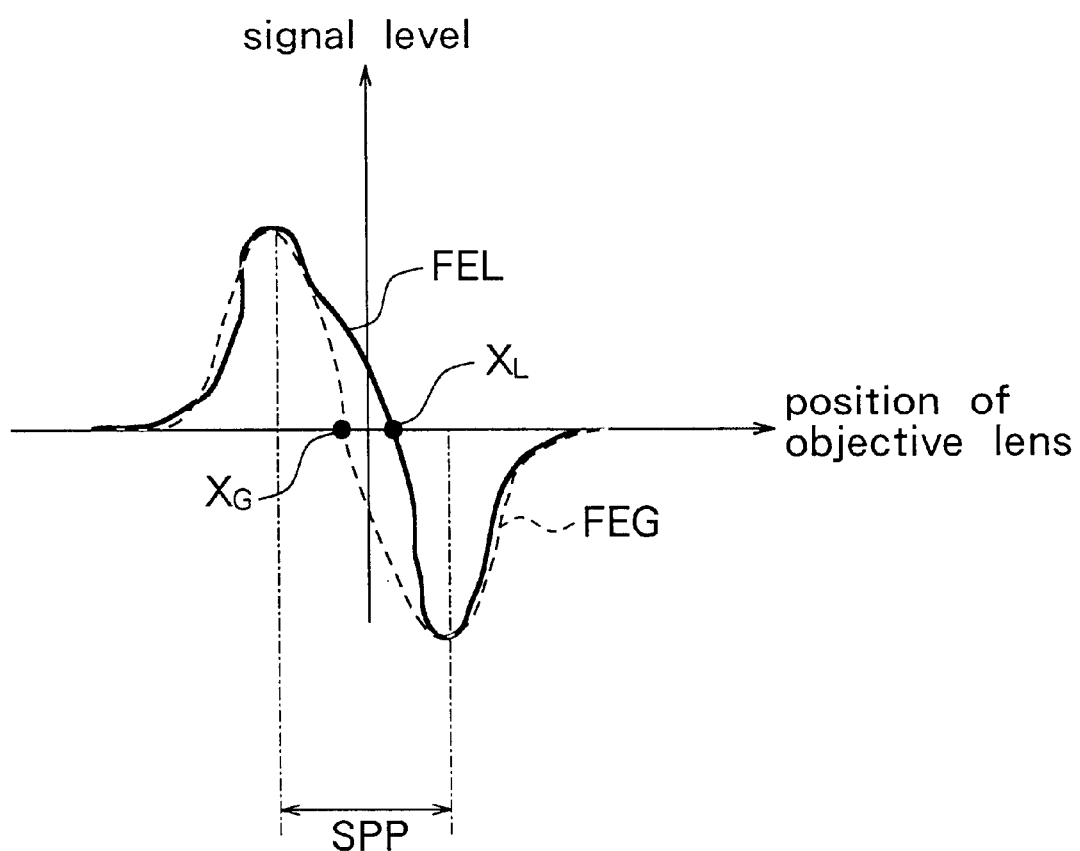
FIG. 3 is a characteristic diagram showing a focus error curve in the conventional optical head.

Embodiments of the invention will be described in detail hereinbelow by referring to the drawings.

Figure 4:
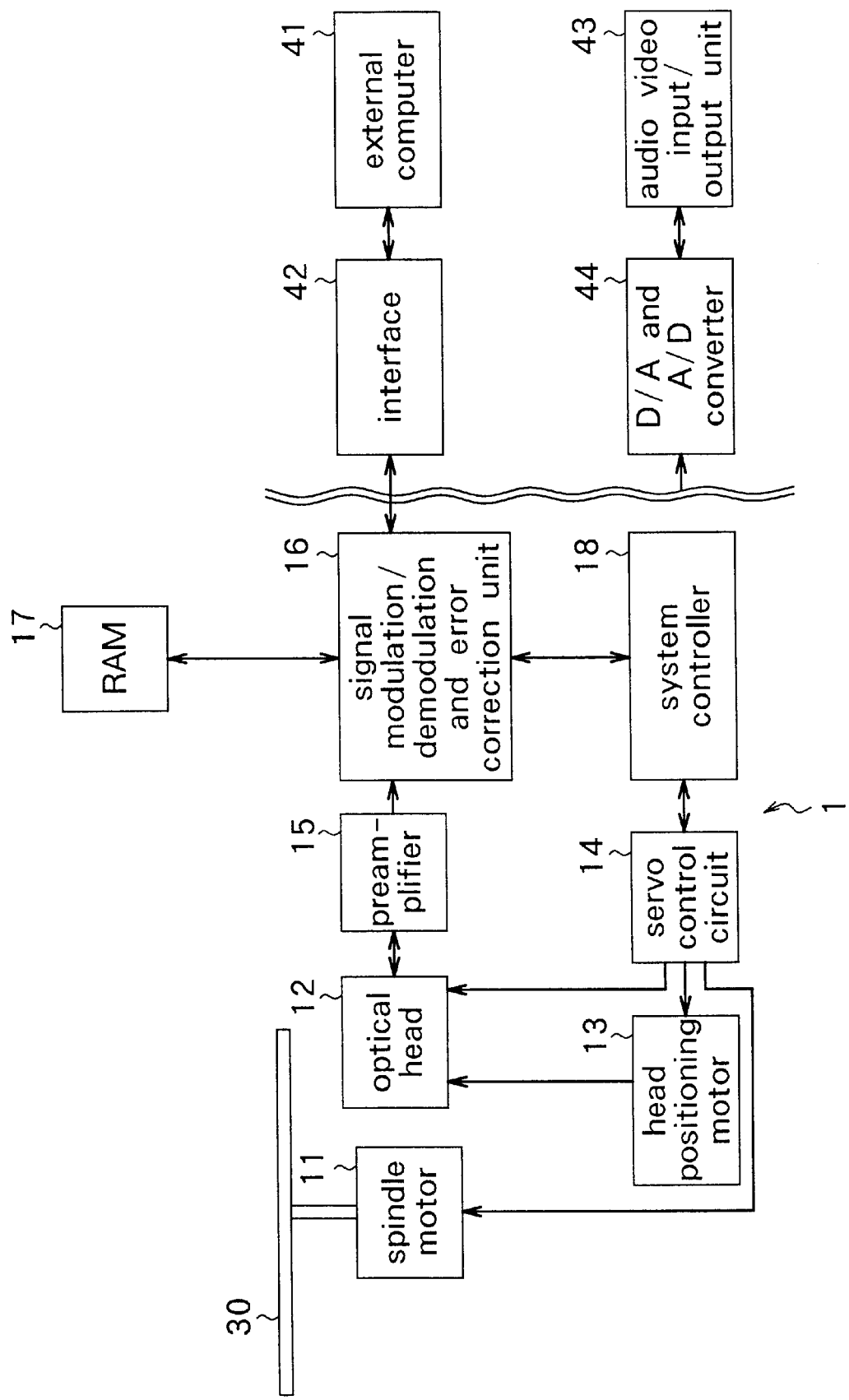
FIG. 4 is a block diagram showing a schematic construction of an optical information recording and reproducing apparatus according to an embodiment of the invention.

FIG. 4 shows a schematic construction of an optical disk drive as an optical information recording and reproducing apparatus according to an embodiment of the invention. Since an optical head, a photodetector and a focus error detecting method according to an embodiment of the invention are embodied by the optical information recording and reproducing apparatus according to the embodiment, they will be also described hereinbelow.

An optical disk drive 1 comprises: a spindle motor 11 for rotating an optical disk 30; an optical head 12; a head positioning motor 13 for moving the optical head 12 in the radial direction of the optical disk 30 to carry the optical head 12 to a predetermined recording track position; and a servo control circuit 14 for controlling the spindle motor 11, the head positioning motor 13 and a biaxial actuator 29 (not shown in FIG. 4) of the optical head 12. The head positioning motor 13 corresponds to an example of "optical head driving means" in the invention, the servo control circuit 14 corresponds to an example of "servo control means" in the invention, and the biaxial actuator 29 corresponds to an example of "objective lens driving means" in the invention.

The optical disk drive 1 further comprises: a preamplifier 15 connected to the optical head 12; a signal modulation/demodulation and error correction unit 16 connected to the output terminal of the preamplifier 15; a RAM (random access memory) 17 as a work memory connected to the signal modulation/demodulation and error correction unit 16; and a system controller 18 for controlling the servo control circuit 14 and the signal modulation/demodulation and error correction unit 16. The signal modulation/demodulation and error correction unit 16 corresponds to an example of "signal processing means" in the invention.

When the optical disk drive 1 is used for, for example, data storage, the optical disk drive 1 further comprises an interface 42 for connecting the signal modulation/demodulation and error correction unit 16 and an external computer 41. When the optical disk drive 1 is used for, for example, audio video, it further comprises an audio video input/output unit 43 for inputting and outputting an audio video signal and a D/A and A/D converter 44. The D/A and A/D converter 44 has the function of performing digital-to-analog (hereinbelow, described as D/A) conversion on an output signal of the signal modulation/demodulation and error correction unit 16 and sending the resultant analog signal to the audio video input/output unit 43. The D/A and A/D converter 44 also has the function of performing analog-to-digital (hereinbelow, described as A/D) conversion on the audio video signal received by the audio video input/output unit 43 and transmitting the resultant digital signal to the signal modulation/demodulation and error correction unit 16.

As the optical disk 30, a plurality of kinds of optical disks can be used. Especially, besides recording media such as CD, CD-R and DVD of a recording system of recording information on only either lands or grooves, a DVD-RAM or the like of the land/groove recording system for recording information on both the lands and grooves can be also used. One of the plurality of kinds optical disks is selected and information can be at least either recorded or reproduced to/from the optical disk. The lands and grooves correspond to an example of "track guiding structure" in the invention.

The spindle motor 11 is controlled by the servo control circuit 14 in accordance with an instruction from the system controller 18 and is rotated at a predetermined rotational speed.

The signal modulation/demodulation and error correction unit 16 has: a signal modulating unit (not shown) for modulating a signal supplied from the outside so as to be recorded on the optical disk 30; a signal demodulating unit (not shown) for demodulating a signal reproduced from the optical disk 30; and an error correcting unit (not shown) for adding an error correction code to a signal to be recorded on the optical disk 30 and correcting an error of a signal reproduced from the optical disk 30 by using the error correction code.

The optical head 12 records information by irradiating the signal recording surface of the rotating optical disk 30 with a light beam modulated by the recording signal in accordance with the instruction of the signal modulation/demodulation and error correction unit 16. The optical head 12 emits light to the optical disk 30, detects reflection light beam modulated by the signal recording surface and supplies a signal corresponding to the reflection light beam to the preamplifier 15.

The preamplifier 15 generates both an RF signal as a reproduction signal on the basis of the signal from the optical head 12 and a servo signal according to the kind of an optical disk to be reproduced. The RF signal is supplied to the signal modulation/demodulation and error correction unit 16 and is subjected to a predetermined process such as demodulation and error correcting process based on the signal. The servo signals include at least a focus pull-in signal, a focus error signal and a tracking error signal and are supplied to the servo control circuit 14. The servo control circuit 14 controls the operation of the optical head 12 on the basis of the servo signals. Specifically, on the basis of the focus pull-in signal and the focus error signal, the focus servo control for moving the objective lens 27 (FIG. 5) of the optical head 12 in the optical axis direction is performed. By the control, the state such that the light beam condensed by the objective lens 27 is always in focus on the signal recording surface of the optical disk 30 is maintained. On the basis of the tracking error signal, the tracking servo control for moving the objective lens 27 of the optical head 12 in the radial direction of the optical disk 30 is performed. By the control, the state such that the light beam condensed by the objective lens 27 is always positioned on a land or a groove in the optical disk 30 is maintained.

The reproduction signal demodulated by the signal modulation/demodulation and error correction unit 16 is, if it is for a data storage in a computer, transmitted to the external computer 41 via the interface 42.

Figure 5:
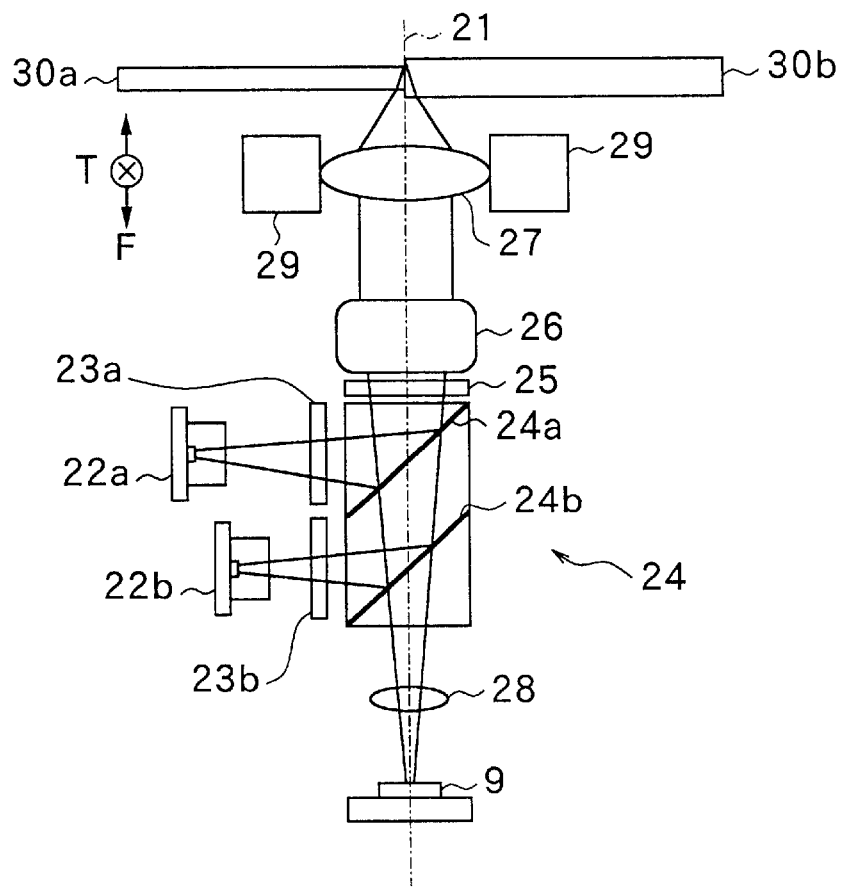
FIG. 5 is a diagram showing a whole construction of an optical head according to an embodiment of the invention.

FIG. 5 shows the construction of the optical head 12 illustrated in FIG. 4. As shown in FIG. 5, the optical head 12 comprises: the objective lens 27 disposed to face a DVD 30a or a CD 30b (hereinbelow, collectively called the optical disk 30); the biaxial actuator 29 capable of driving the objective lens 27 both in the focusing direction F (direction perpendicular to the face of the optical disk 30, that is, the direction of the optical axis 21 of the objective lens 27) and in the tracking direction T (track crossing direction, that is, the radial direction of the optical disk 30 or the direction perpendicular to the drawing sheet); a collimator lens 26; a 5/4 wave plate 25 for 650 nm; a prism-shaped beam splitter 24; a multilens 28; and a photodetector 9. The collimator lens 26, the 5/4 wave plate 25, the beam splitter 24, the multilens 28 and the photodetector 9 are sequentially arranged from the optical disk 30 side along the optical axis 21 of the optical head 12.

The photodetector 9 corresponds to an example of "photodetecting means" in the invention, the beam splitter 24 corresponds to an example of "light splitting means" in the invention, and the multilens 28 corresponds to an example of "astigmatism causing means" in the invention.

In the beam splitter 24, two light splitting faces each of which forms an angle of about 45 degrees with the optical axis 21 are formed. A polarization splitting film 24a for 650 nm is formed on the light splitting face positioning closer to the optical disk 30 and a wavelength selecting film 24b is formed on the light splitting face positioning further from the optical disk 30. The beam splitter 24 can be configured by, for example, a plurality of optical prisms and a dielectric multilayer formed by vapor deposition or sputtering between the optical prisms.

The optical head 12 also has two semiconductor lasers 22a and 22b which emit light in the direction almost orthogonal to the optical axis 21. The semiconductor laser 22a is disposed in a position corresponding to the light splitting face on which the polarization splitting film 24a is formed and emits a laser beam having a wavelength of 650 nm. The semiconductor laser 22b is disposed in a position corresponding to the light splitting face on which the wavelength selecting film 24b is formed and emits a laser beam having a wavelength of 780 nm. Between the semiconductor laser 22a and the beam splitter 24, a diffraction grating 23a for diffracting a laser beam of 650 nm emitted from the semiconductor laser 22a is disposed. Between the semiconductor laser 22b and the beam splitter 24, a diffraction grating 23b for diffracting the laser beam of 780 nm emitted from the semiconductor laser 22b is disposed.

The semiconductor lasers 22a and 22b are light emitting devices using recombination light of a semiconductor. The semiconductor laser 22a emits a laser beam which becomes almost S-polarized light (linearly polarized light of which polarizing direction is perpendicular to the incident face) with respect to the light splitting face on which the polarization splitting film 24a is formed of the beam splitter 24. The polarization splitting film 24a reflects almost all of the S-polarized light components and transmits almost all of the P-polarized light components. The light having the wavelength of 780 nm emitted from the semiconductor laser 22b of a quantity corresponding to the reflectance of the Wavelength selecting film 24b is reflected by the wavelength selecting film 24b, and light of a quantity corresponding to the transmittance of the wavelength selecting film 24b is allowed to pass through the wavelength selecting film 24b. Almost all of the light having the wavelength of 650 nm which is emitted from the semiconductor laser 22a and reflected by the optical disk 30 is allowed to pass through the wavelength selecting film 24b.

The optical head 12 has a base member (not shown) supported so as to be movable in the radial direction of the optical disk 30 along a guide (not shown). The components of the optical head 12 except for the objective lens 27 are fixed to the base member.

Figure 6:
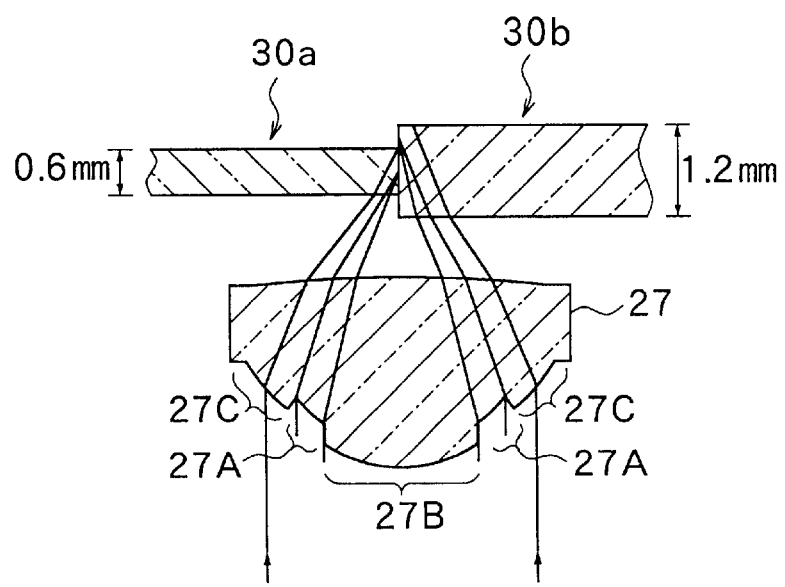
FIG. 6 is a cross section showing the construction of an objective lens in FIG. 5.
Figure 7:
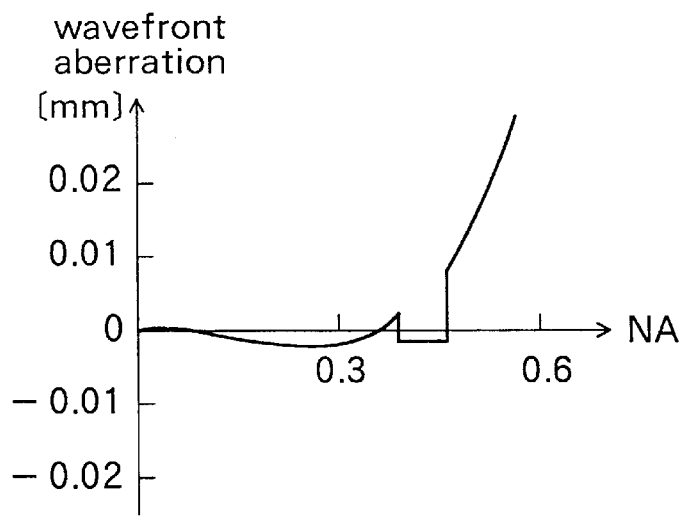
FIG. 7 is a characteristic diagram showing a wavefront aberration characteristic of the objective lens illustrated in FIG. 6.

The objective lens 27 has the zonal substrate thickness correcting part 27A as shown in FIG. 6 and has wavefront aberration as shown in FIG. 7 with respect to the light having the wavelength of 650 nm emitted from the semiconductor laser 22b. The objective lens 27 is driven in both the focusing direction F and the tracking direction T by the biaxial actuator 29. Since the structure and the wavefront aberration characteristic of the objective lens 27 have been described in the description of the related art, their description is omitted here.

A diffraction device 23a diffracts the light from the semiconductor laser 22a to generate mainly three diffraction rays of a 0 order diffraction ray and ±primary diffraction rays. A diffraction device 23b diffracts the light from the semiconductor laser 22b to generate mainly three diffraction rays of a 0 order diffraction ray and ±primary diffraction rays.

The collimator lens 26 converts light from the beam splitter 24 into parallel luminous flux. The objective lens 27 condenses light from the collimator lens 26 and makes the light converge onto the signal recording surface. The return light from the optical disk 30 sequentially passes through the objective lens 27, the collimator lens 26, the beam splitter 24 and the multilens 28 and is incident on the photodetector 9.

The multilens 28 is a composite lens having a cylindrical face and a concave face and has both the cylindrical lens function and the concave lens function. The multilens 28 is disposed so that the direction of the generating line of the cylindrical face and the arrangement direction of diffraction patterns by tracks (lands or grooves) form 45 degrees. By the cylindrical lens function, astigmatism for obtaining a focus error signal is allowed to occur in the outgoing light from the beam splitter 24. By the concave lens function, the length of the optical path of the light beam can be extended to the photodetector 9.

The 5/4 wave plate for 650 nm gives a phase difference of 5/4 wavelengths to the light of 650 nm from the semiconductor laser 22a and gives a phase difference of almost one wave to the light of 780 nm from the semiconductor laser 22b.

Figure 8:
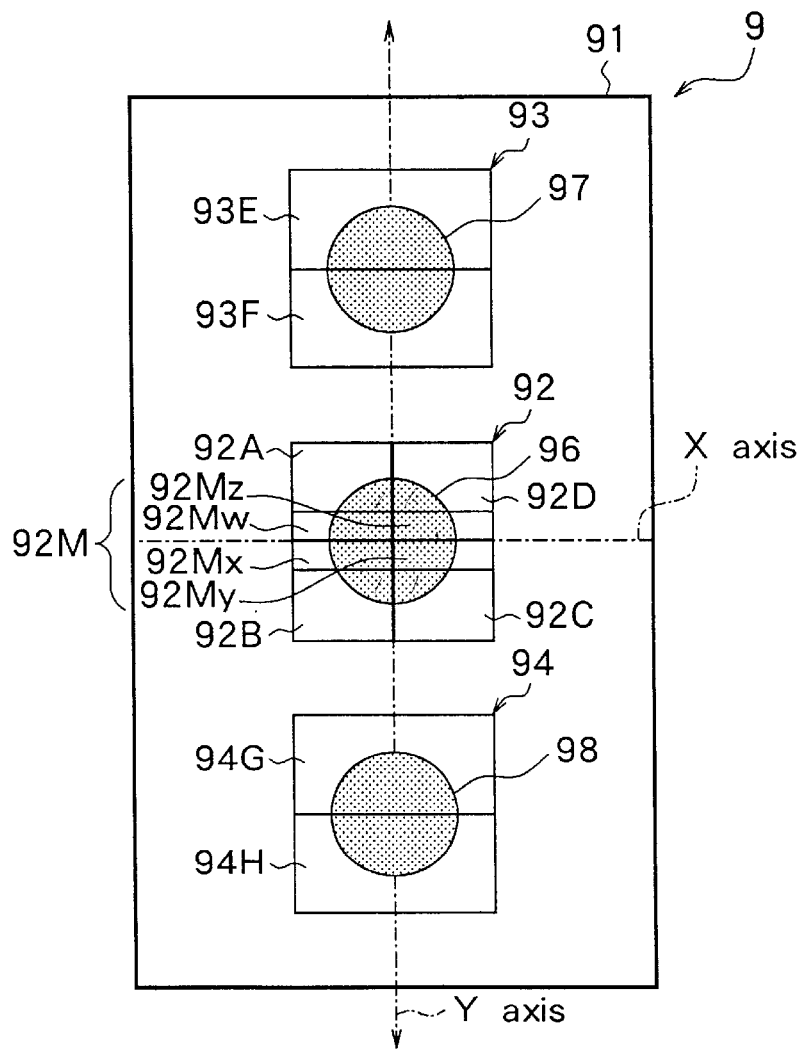
FIG. 8 is a plan view showing the construction of a photodetector in FIG. 5.

FIG. 8 is a plan view showing the structure of the photodetector 9. In the photodetector 9 in the embodiment, the center area of the photoreceiving part 192 for the main spot in the photodetector 19 shown in the related art (FIG. 1) is divided in the tracking direction to form an intermediate area. Four photoreceiving parts are newly disposed in the intermediate area. Each of the photoreceiving parts for receiving side spots is divided in the direction corresponding to the tangential line of tracks so as to be adapted to the push-pull tracking servo control. The structure in plan view of the photodetector 9 will be described hereinbelow more specifically.

In FIG. 8, it is assumed that the lateral axis passing the center of the photodetector 9 is the X axis and the vertical axis passing the center of the photodetector 9 is the Y axis. The Y-axis direction corresponds to the direction orthogonal to the tracking direction T on the optical disk 30 (that is, the tangential line direction of tracks) and is also orthogonal to the arrangement direction immediately after reflection of the plurality of diffraction patterns (0 order ray and ±primary rays and the like) generated in the reflection light beam by the lands and the grooves of the optical disk 30.

As shown in FIG. 8, the photodetector 9 comprises: a substrate 91; a photoreceiving part 92 for the main spot having a rectangular shape as a whole, which is disposed in the center area of the substrate 91; and two photoreceiving parts 93 and 94 for side spots having almost the same shape and size which are disposed on both sides in the Y-axis direction of the photoreceiving part 92 for the main spot at almost equal intervals.

The central photoreceiving part 92 for the main spot includes four peripheral photoreceiving parts 92A, 92B, 92C and 92D which are disposed almost symmetrically with respect to the Y-axis and the X-axis and have almost the same shape and size; and an intermediate photoreceiving part 92M disposed in the intermediate area sandwiched by two rows (a row consisting of the photoreceiving parts 92A and 92D and a row consisting of the photoreceiving parts 92B and 92C) which are parallel to the X axis. The intermediate photoreceiving part 92M is further divided into four small photoreceiving parts 92Mw, 92Mx, 92My and 92Mz by the Y and X axes.

The photoreceiving part 93 for the side spot is divided by the X axis into two photoreceiving parts 93E and 93F having almost the same shape and size. The photoreceiving part 94 for the side spot is divided by the Y axis into two photoreceiving parts 94G and 94H having almost the same shape and size.

Detection signals from the divided photoreceiving parts in the photoreceiving part 92 for the main spot and the divided photoreceiving parts in the photoreceiving parts 93 and 94 for the side spots are subjected to, for example, a current-voltage conversion by an amplifier (not shown) formed on the substrate 91 of the photodetector 9 and then processed by an arithmetic circuit 40 (FIG. 9) provided on the substrate 91, thereby not only the RF signal as a reproduction signal but also servo signals for control such as the focus pull-in signal FPI, focus error signal FCS and tracking error signal TRK are calculated.

In the embodiment, the focus error signal FCS is calculated by the following equation (5).

$$FCS=\{(a+c)-(b+d)\}-K1\times\{(mw+my)-(mx+mz)\}-K2\times\{(mw+my)+(mx+mz)\} \quad (5)$$

where, a, b, c and d denote output signals from the peripheral photoreceiving parts 92A to 92D, respectively, mw, my, mx and mz denote output signals from the small photoreceiving parts 92Mw, 92Mx, 92My and 92Mz of the intermediate photoreceiving part 92M, respectively, and K1 and K2 are coefficients which can be positive or negative values or zero. As will be described hereinlater, the coefficient K1 is a correction coefficient for canceling the influence by the astigmatism of the optical system itself of the optical head 12. The coefficient K2 is a correction coefficient for canceling the influence when the gain of the focus servo control in the case where a spot is on a land and that in the case where a spot is on a groove are different from each other.

A focus error signal FCS1 when it is assumed that K1=0 and K2=0 is given by the following equation (6).

$$FCS1=(a+c)-(b+d) \quad (6)$$

A focus error signal FCS2 when it is assumed that K1≠0 and K2=0 is given by the following equation (7).

$$FCS2=\{(a+c)-(b=d)\}-K1\times\{(mw+my)-(mx+mz)\} \quad (7)$$

A focus error signal FCS3 when it is assumed that K1=0 and K2≠0 is given by the following equation (8).

$$FCS3=\{(a+c)-(b+d)\}-K2\times\{(mw+my)+(mx+mz)\} \quad (8)$$

A focus error signal FCS4 when it is assumed that K1≠0 and K2≠0 is given by the following equation (9) which is the same equation (5).

$$FCS4=\{(a+c)-(b+d)\}-K1\times\{(mw+my)-(mx+mz)\}-K2\times\{(mw+my)+(mx+mz)\} \quad (9)$$

Figure 9:
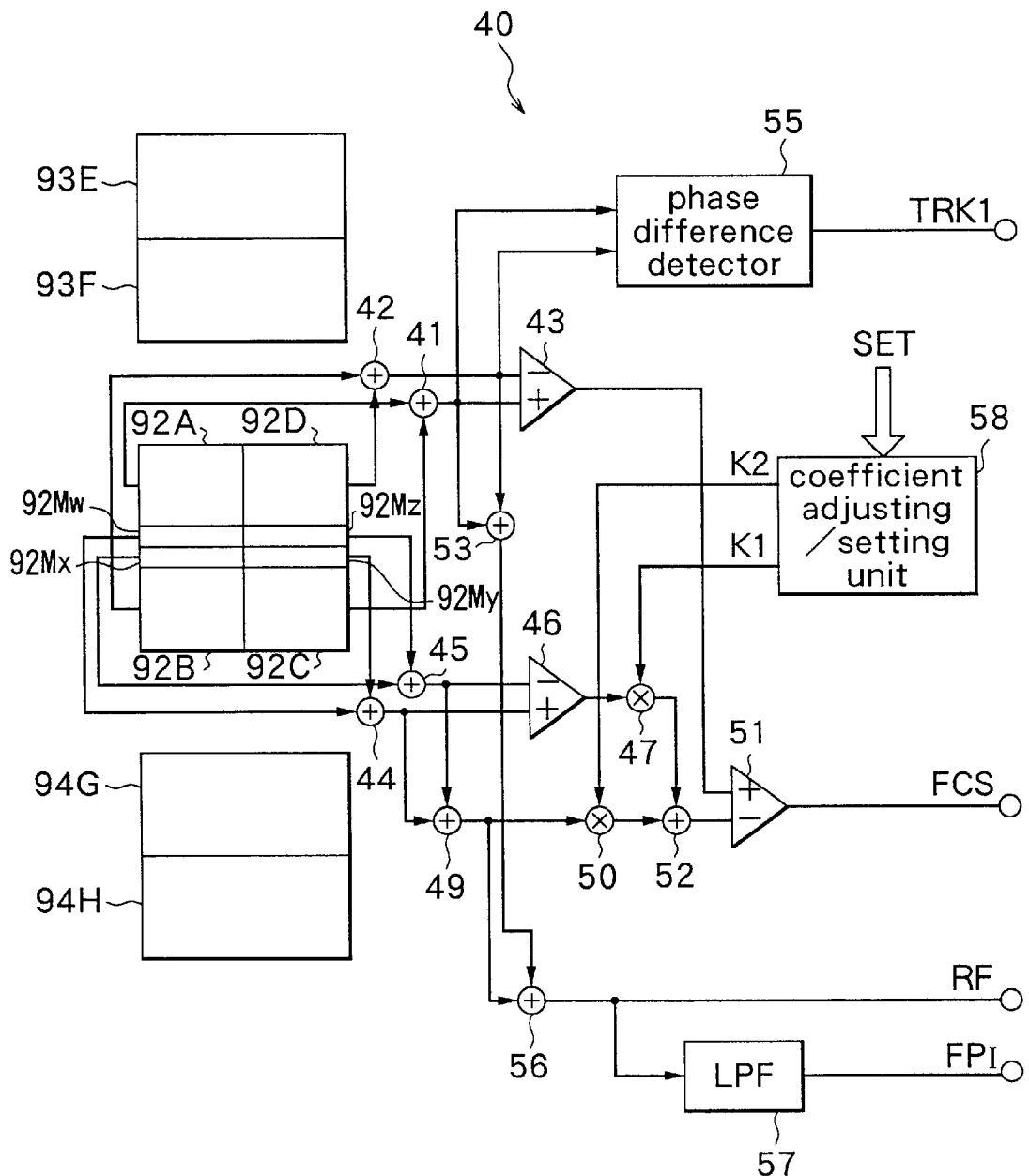
FIG. 9 is a circuit diagram showing the construction of an arithmetic circuit of the photodetector.

As described above, by the combination of the coefficients K1 and K2, one of the four kinds of focus error signals FCS1, FCS2, FCS3 and FCS4 expressed by the equations (6) to (9) can be selectively calculated by the arithmetic circuit 40 shown in FIG. 9.

Specifically, when the optical disk 30 is a CD or a DVD, for example, by setting that K1=−1 and K2=0, the focus error signal FCS2 can be used. The focus error signal FCS2 in this case is the same as the focus error signal FE in the conventional astigmatism method. When the optical disk 30 is a DVD-RAM, for example, by setting that K1=0 and K2=0, the focus error signal FCS1 can be used. The other combinations are also possible.

On the other hand, the arithmetic circuit 40 can selectively compute one of the four kinds of tracking error signals TRK1, TRK2, TRK3 and TRK4 as a signal for tracking error detection. The tracking error signals are computed by the following equations (10) to (14). K3 is a coefficient which can be a positive or negative value or zero.

$$TRK1 = \text{phase difference signal between } (a+c) \text{ and } (b+d) \quad (10)$$

$$TRK2 = \text{phase difference signal between } (a+mw+c+my) \text{ and } (b+mx+d+mz) \quad (11)$$

$$TRK3 = \{(a+d)-(b+c)\}-K3\{(e-f)+(g-h)\} \quad (12)$$

$$TRK4 = \{(a+d+mw+mz)-(b+c+mx+my)\}-K3\{(e-f)+(g-h)\} \quad (13)$$

$$TRK5 = (e+f)-(g+h) \quad (14)$$

TRK2 denotes the tracking error signal used for performing detection by the differential phase difference method which is the same as that of the conventional technique. TRK4 is a tracking error signal used in the case of performing detection by a differential push-pull method. TRK1 is obtained by eliminating the output signals mw, mx, my and mz of the small photoreceiving parts 92Mw, 92Mx, 92My and 92Mz from TRK2. TRK3 is obtained by eliminating the output signals mw, mx, my and mz from TRK4. TRK5 is a tracking error signal used in the case of performing detection by the three-beam method (three-spot method).

More specifically, preferably, TRK1 or TRK2 is used in the case of a DVD. TRK3 or TRK4 is used in the case of a DVD-ROM. TRK5 is used for a CD.

The RF signal is calculated by, for example, the following equation (15). This is substantially the same as the conventional technique.

$$RF = a+b+c+d+mw+mx+my+mz \quad (15)$$

The focus pull-in signal FPI is obtained by removing high frequency components of the RF signal by a low pass filter.

FIG. 9 shows an example of the arithmetic circuit for performing a signal process on the detection signal outputted from each of the divided photoreceiving parts of the photodetector 9. As shown in the diagram, the arithmetic circuit 40 comprises: an adder 41 for adding output signals of the peripheral photoreceiving parts 92A and 92C; an adder 42 for adding output signals of the peripheral photoreceiving parts 92B and 92D; and a differential device 43 for obtaining a difference between the output signals of the adders 41 and 42. The arithmetic circuit 40 corresponds to an example of "focus detecting means" or "arithmetic means" in the invention.

The arithmetic circuit 40 further comprises: an adder 44 for adding output signals of the small photoreceiving parts 92Mw and 92My in the intermediate photoreceiving part 92M; an adder 45 for adding output signals of the small photoreceiving parts 92Mx and 92Mz in the intermediate photoreceiving part 92M; and a differential device 46 for obtaining a difference between the output signals of the adders 44 and 45.

The arithmetic circuit 40 further comprises: a multiplier 47 for multiplying an output signal of the differential device 46 by the coefficient K1; an adder 49 for adding output signals of the adders 44 and 45; a multiplier 50 for multiplying an output signal of the adder 49 by the coefficient K2; an adder 52 for adding an output signal of the multiplier 47 and an output signal of the multiplier 50; and a differential device 51 for obtaining a difference between an output signal of the adder 52 and an output signal of the differential device 43 to calculate the focus error signal FCS expressed by the equation (5). An output signal [(mw+my)−(mx+mz)] of the differential device 46 corresponds to an example of "intermediate differential signal" in the invention. An output signal [(mw+my)+(mx+mz)] of the adder 49 corresponds to an example of "intermediate total sum signal" in the invention.

The arithmetic circuit 40 further comprises: an adder 53 for adding output signals of the adders 41 and 42; an adder 56 for obtaining an RF signal by adding output signals of the adders 49 and 53; a low pass filter (LPF) 57 for obtaining the focus pull-in signal FPI by eliminating high frequency components from an output signal of the adder 56; and a phase difference detector 55 for detecting a phase difference between output signals of the adders 41 and 42 and outputting it as the tracking error signal TRK1.

Further, the arithmetic circuit 40 comprises a coefficient adjusting/setting unit 58 capable of setting the coefficients K1 and K2 to predetermined values on the basis of a setting signal SET supplied from the system controller 18 (FIG. 4) or adjusting the coefficients K1 and K2 to optimum values and outputting the resultant values. By adjusting the values of the coefficients K1 and K2, one of the focus error signals FCS1 to FCS4 expressed by the equations (6) to (9) or the same signal as the focus error signal FE based on the conventional astigmatism method shown by the equation (2) can be selected.

The focus error signal FCS corresponds to an example of a "focus error signal" in the invention. The coefficient adjusting/setting unit 58 corresponds to an example of "switching means" in the invention.

In a manner similar to the focus error signal, the tracking error signals TRK2 to TRK4 other than the tracking error signal TRK1 are generated by using adder, multiplier, differential device and the like which are omitted in FIG. 9.

The operation and action of the optical head 12 having the construction as described above and the optical disk drive 1 including the optical head 12 will now be described.

First, the overall operation of the optical disk drive 1 will be described. The spindle motor 11 is controlled by the system controller 18 and the servo control circuit 14 and is rotated at a predetermined rotational speed. The optical head 12 reproduces information by irradiating the signal recording surface of the optical disk 30 with the laser beam for reproduction and detecting the return light. A reproduction signal outputted from the optical head 12 is amplified by the preamplifier 15, subjected to the error correcting process by the error correction unit and demodulated by the signal demodulation unit in the signal modulation/demodulation and error correction unit 16. The resultant signal is transmitted via the interface 42 to the external computer 41, or D/A converted by the D/A and A/D converter 44 and is outputted from the audio video input/output unit 43. On the other hand, the servo control circuit 14 controls the spindle motor 11 and the head positioning motor 13 on the basis of the instruction from the system controller 18 and controls the focusing operation and the tracking operation of the objective lens 27 of the optical head 12 on the basis of the servo signal supplied from the optical head 12 via the preamplifier 15.

Referring now to FIG. 5, the operation and the action of the optical head 12 will be described.

Reproduction of DVD

First, the case of reproducing information recorded on the DVD 30a will be described. In this case, the DVD 30a may be a reproduction-only DVD (such as DVD-ROM or DVD-video) in which only either lands or grooves are used as a recording area or a DVD-RAM in which both lands and grooves are used as a recording area.

For reproduction of the DVD 30a, a light beam having a wavelength of 650 nm emitted from the semiconductor laser 22a is used. The light beam having the wavelength of 650 nm emitted from the semiconductor laser 22a is split into three light beams of the 0 order ray and ±primary rays by the diffraction grating 23a. After that, the three rays enter the polarization splitting film 24a in the beam splitter 24. Since the incident light is almost the S-polarized light with respect to the polarization splitting film 24a light of almost all of the quantity of the light is reflected by the polarization splitting film 24a and is incident on the 5/4 wave plate 25 for 650 nm. The 5/4 wave plate 25 for 650 nm generates a phase difference of 5/4 wavelengths between an ordinary ray and an extraordinary ray of the incident light beam, thereby converting linearly polarized light incident on the 5/4 wave plate 25 for 650 nm into almost circularly polarized light. The circularly polarized light which goes out from the 5/4 wave plate 25 for 650 nm further enters the collimator lens 26 and is converted to parallel light beams which are incident on the objective lens 27.

The objective lens 27 makes each of the three incident rays converge to a point on the signal recording surface of the DVD 30a. The objective lens 27 is driven in the focusing direction F and the tracking direction T in FIG. 5 by the biaxial actuator 29 on the basis of the instruction from the servo control circuit (FIG. 4).

The three reflection rays from the signal recording surface of the DVD 30a are again incident on the 5/4 wave plate 25 for 650 nm via the objective lens 27 and the collimator lens 26. The 5/4 wave plate 25 for 650 nm gives a phase difference of 5/4 wavelength between the ordinary ray and the extraordinary ray to the incident reflection rays (circularly polarized light). The light is converted to linearly polarized light of which polarizing direction at the time of incoming has changed by 90 degrees and the linearly polarized light is incident on the beam splitter 24. Since the light is P-polarized light with respect to the polarization splitting film 24a of the beam splitter 24, the light is allowed to almost pass through the polarization splitting film 24a, is separated from the incoming light and enters the wavelength selecting film 24b. The wavelength selecting film 24b reflects only light of 780 nm and allows almost all of light having the wavelength of 650 nm to pass there through. Consequently, the reflection light from the DVD 30a passes through the wavelength selecting film 24b as it is and enters the multilens 28.

Astigmatism (astigmatic difference) for obtaining a focus error signal by the focus error detecting method of the embodiment is given to the three reflection rays which have entered the multilens 28 from the DVD 30a. The resultant light enters the photodetector 9.

In the photodetector 9, the three rays to which astigmatism is given by the multilens 28 are incident on the photoreceiving part 92 for the main spot and the photoreceiving parts 93 and 94 for the side spot and form beam spots. The peripheral photoreceiving parts 92A to 92D in the photoreceiving part 92 for the main spot, small photoreceiving parts 92Mw, 92Mx, 92My and 92Mz and photoreceiving parts 93E, 93F, 94G and 94H of the photoreceiving parts 93 and 94 for side spots generate signals each according to the quantity of irradiation light, which are supplied to the arithmetic circuit 40 shown in FIG. 9.

The arithmetic circuit 40 calculates and outputs the focus error signal FCS by the arithmetic process shown in the equation (5) in accordance with the kind and the like of the optical disk 30. At the time of calculating the focus error signal FCS, the coefficients K1 and K2 outputted from the coefficient adjusting/setting unit 58 are used. Specifically, in the case where the optical disk 30 is a DVD, for example, by setting that K1=−1 and K2=0, FCS2 expressed by the equation (7) is outputted as a focus error signal FCS. In the case where the optical disk 30 is a DVD-RAM, for example, by setting that K1=0 and K2=0, FCS1 expressed by the equation (6) is outputted as a focus error signal FCS. The coefficients K1 and K2 may be other values.

The arithmetic circuit 40 also calculates any of the signals TRK1 to TRK5 by corresponding to one of the equations (10) to (14) in accordance with the kind or the like of the optical disk 30 and outputs the resultant signal as a tracking error signal TRK. Specifically, in the case where the optical disk 30 is a DVD, for example, TRK1 or TRK2 is used as the tracking error signal. In the case where the optical disk 30 is a DVD-RAM, for example, TRK3 or TRK4 is used. The other selecting pattern may be also used.

The arithmetic circuit 40 further generates the RF signal by the arithmetic process shown by the equation (15). The RF signal passes through the low pass filter 57 and becomes the focus pull-in signal FPI.

The center of a beam spot 96 is adjusted to substantially coincide with the center of the photoreceiving part 92 for the main spot (that is, the intersecting point of the four small photoreceiving parts 92Mw, 92Mx, 92My and 92Mz). The center of each of beam spots 97 and 98 is adjusted so as to almost coincide with the center of each of the photoreceiving parts 93 and 94 for the side spots.

FIG. 8 shows a state where each of the beam spots 96, 97 and 98 is almost circular, that is, the optical head is in focus. When the objective lens 27 is out of focus, for example, in a manner similar to the case explained by referring to FIGS. 2A and 2B, the beam spot 96 of the photoreceiving part 92 for the main spot changes its shape to an oval having the major axis of which upper part is inclined to the left from the vertical line by 45 degrees and of which lower part is inclined to the right from the vertical line by 45 degrees or an oval having the major axis of which upper part is inclined to the right from the vertical line by 45 degrees and of which lower part is inclined to the left from the vertical line by 45 degrees. Depending on whether the objective lens 27 is in focus or not, the size of each of the signals outputted from the peripheral photoreceiving parts 92A to 92D and the small photoreceiving parts 92Mw, 92Mx, 92My and 92Mz changes.

The focus error signal FCS is supplied together with any of the tracking error signals TRK1 to TRK5, the focus pull-in signal FPI and the RF signal to the preamplifier 15 and the input signals are amplified. The amplified focus error signal, tracking error signal and focus pull-in signal FPI are supplied to the servo control circuit 14 and the amplified RF signal is supplied to the signal modulation/demodulation and error correction unit 16. The subsequent operations of the signal modulation/demodulation and error correction unit 16 are as described above, so that the description is omitted here.

On condition that the focus pull-in signal FPI is positioned in a range corresponding to the focus pull-in range SPP (FIG. 3), the servo control circuit 14 controls to drive the objective lens 27 in the focusing direction F by the biaxial actuator 29 so that the focus error signal FCS becomes zero. The servo control circuit 14 also drives the objective lens 27 in the tracking direction T by the biaxial actuator 29 so that the tracking error signal TRK becomes zero. In the embodiment, different from the case of FIG. 3 shown as an example, the value of the focus error signal FCS does not vary depending on whether the light beam spot applied on the signal recording surface of the DVD 30a is on a land or groove. The reason will be described in detail hereinlater.

Reproduction of CD

The case of reproducing information recorded on the CD 30b will now be described. The CD 30b may be an ordinary CD or CD-ROM for audio or a CD-R.

For reproduction of the CD 30b, a light beam having a wavelength of 780 nm emitted from the semiconductor laser 22b is used. The light beam having the wavelength of 780 nm emitted from the semiconductor laser 22b is split into three light beams of the 0 order ray and ±primary rays by the diffraction grating 23b. After that, the three rays enter the wavelength selecting film 24b. The three light beams are used to obtain a tracking error signal by the three-spot method.

Each of the three light beams which has entered the wavelength selecting film 24b of a quantity according to the reflectance of the wavelength selecting film 24b is reflected and the resultant enters the polarization splitting film 24a. The polarization splitting film 24a transmits most of the light beam having the wavelength of 780 nm. The three light beams passing through the polarization splitting film 24a are incident on the 5/4 wave plate 25 for 650 nm. Since the 5/4 wave plate 25 for 650 nm acts as a one-wave plate for the light having a wavelength of 780 nm, the polarization state of the incident light does not change. Therefore, the light passes through the 5/4 wave plate 25 as it is and enters the collimator lens 26. The collimator lens 26 converts each of the three incident light beams to parallel light which is incident on the objective lens 27.

The objective lens 27 makes each of the three incident light beams converge to a point on the signal recording surface of the CD 30b. The three reflection light beams from the signal recording surface of the CD 30b again enter the 5/4 wave plate 25 for 650 nm via the objective lens 27 and the collimator lens 26 and pass through the 5/4 wave plate 25 as it is without a change in the polarization state.

The three light beams which have passed through the 5/4 wave plate 25 for 650 nm enter the beam splitter 24, pass through the polarization splitting film 24a and are incident on the wavelength selecting film 24b. The wavelength selecting film 24b transmits the light only by the quantity according to its transmittance to separate the light from the incoming light from the semiconductor laser 22b. The three light beams which have passed through the wavelength selecting film 24b enter the multilens 28 where the astigmatism is added to the light beams and the resultant light beams are incident on the photodetector 9.

The 0 order ray as the center ray in the three light beams to which astigmatism is added by the multilens 28 is incident on the photoreceiving part 92 for the main spot and forms a beam spot. The ±primary rays on both sides are incident on the photoreceiving parts 93 and 94 for the side spots and form beam spots, respectively.

The peripheral photoreceiving parts 92A to 92D and the small photoreceiving parts 92Mw, 92Mx, 92My and 92Mz of the photoreceiving part 92 for the main spot output signals each according to the quantity of irradiated light and the signals are supplied to the arithmetic circuit 40 shown in FIG. 9. The arithmetic circuit 40 calculates and outputs the focus error signal FCS in accordance with the equation (5). At the time of calculating the focus error signal FCS, the coefficients K1 and K2 outputted from the coefficient adjusting/setting unit 58 are used. Specifically, for example, by setting that K1=−1 and K2=0, FCS2 expressed by the equation (7) is outputted as a focus error signal. This is the same as the focus error signal FE obtained by the conventional astigmatism method. The coefficients K1 and K2 may be other values.

The arithmetic circuit 40 also calculates any of the tracking error signals TRK1 to TRK5 by the arithmetic process corresponding to one of the equations (10) to (14) and outputs the resultant signal as a tracking error signal TRK. Specifically, for example, TRK5 is used as the tracking error signal. The other signal, for example, the signal TRK3 of the equation (12) using also output signals from the photoreceiving parts 93E, 93F, 94G and 94H of the photoreceiving parts 93 and 94 for side spots may be also used.

The arithmetic circuit 40 further generates the RF signal by the arithmetic process shown by the equation (15). The RF signal passes through the low pass filter 57 and becomes the focus pull-in signal FPI. The subsequent focus error detection and the focusing control are similar to those in the case of the DVD 30a.

Principle of Focus Error Detection

The principle of detecting a focus error used in the embodiment will be described, in comparison with the astigmatism method in the conventional technique.

As described above, when the focus error detection by the conventional astigmatism method using the photodetector 19 having the construction shown in FIG. 1 is performed on the recording medium of the land/groove recording system such as a DVD-RAM, "track crossing noise" occurs in the focus error signal. It has mainly the following two causes.

The first cause relates to the disk structure peculiar to the land/groove recording system. The "track crossing noise" always occurs when an ordinary disk of the land/groove recording system and the conventional astigmatism method are combined. The degree of contribution varies according to the relation between the track pitch and the NA of the objective lens, and the focus error pull-in range.

The second cause is that the light beam converged by the optical head and emitted to an optical disk already includes the astigmatism. The degree of contribution largely varies according to the magnitude and direction of the astigmatism.

First Cause of Track Crossing Noise

The first cause will be described first. Generally, a light beam condensed by the objective lens falls on a land or groove in the optical disk and is diffracted by reflection. In the case of the land/groove recording system, information is recorded on both lands and grooves, the track pitch (distance between lands or distance between grooves) to the diameter of the light beam spot condensed by the objective lens becomes relatively large. As a result, as shown in FIGS. 10A and 10B and FIGS. 11A and 11B, an overlapping manner of diffracted light from the optical disk on the pupil of the objective lens largely differs from that of the land recording system or the groove recording system (hereinbelow, referred to as a groove recording system for simplicity of explanation).

Figure 10A:
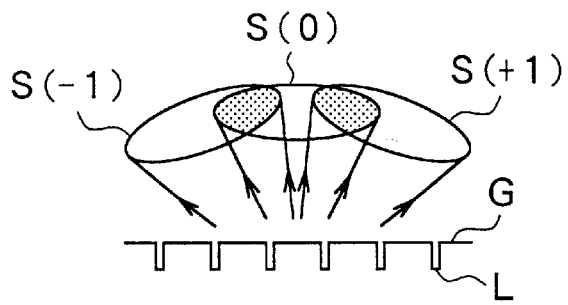
FIGS. 10A and 10B are diagrams for explaining a groove recording system.
Figure 10B:
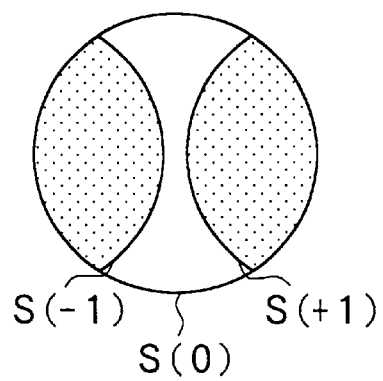
Figure 11A:
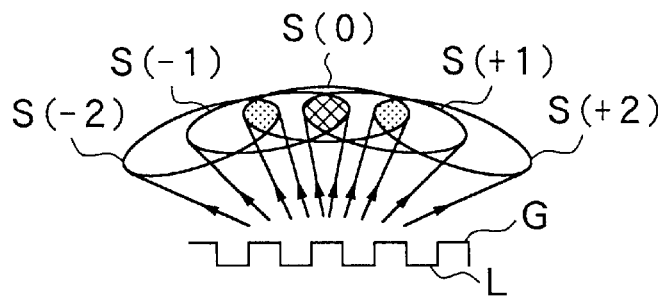
FIGS. 11A and 11B are diagrams for explaining a land/groove recording system.
Figure 11B:
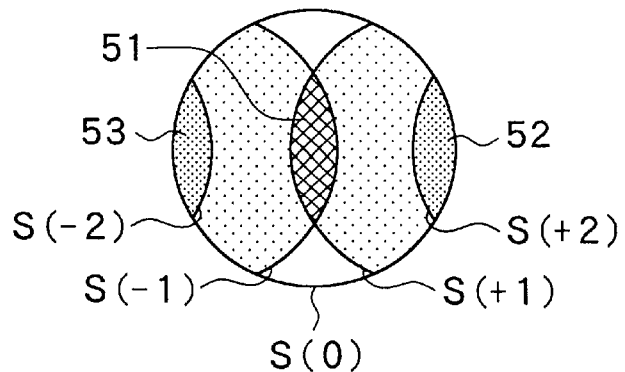

FIG. 10A shows the relation between the signal recording surface of the optical disk in the groove recording system and each of the diffracted rays. FIG. 10B shows the overlapping state of the diffracted rays on the pupil of the objective lens in the groove recording system. FIG. 11A shows the relation between the signal recording surface of the optical disk in the land/groove recording system and each of the diffracted rays. FIG. 11B shows the overlapping state of the diffracted rays on the pupil of the objective lens in the land/groove recording system. In the specification, in FIGS. 10A and 11A, a projected part on the signal recording surface when it is seen from the light irradiation side is called a groove G and a recessed part is called a land L.

At the time of reproducing an optical disk of the groove recording system such as an MD (Mini Disc), as shown in FIGS. 10A and 10B, usually, the +primary ray S (+1) and the −primary ray S (−1) are not overlapped with each other. On the contrary, at the time of reproducing the optical disk in the land/groove recording system such as a DVD-RAM, as shown in FIGS. 10A and 10B, an interference region 51 in which all of the three diffracted rays of the 0 order ray S (0), the +primary ray S(+1) and the −primary ray S(−1) are overlapped is generated. Further, in this case, an interference region 52 in which the 0 order ray S(0) and a +secondary ray S (+2) are overlapped with each other and an interference region 53 in which the 0 order ray S (0) and a −secondary ray S (−2) are overlapped with each other are also generated.

Figure 12A:
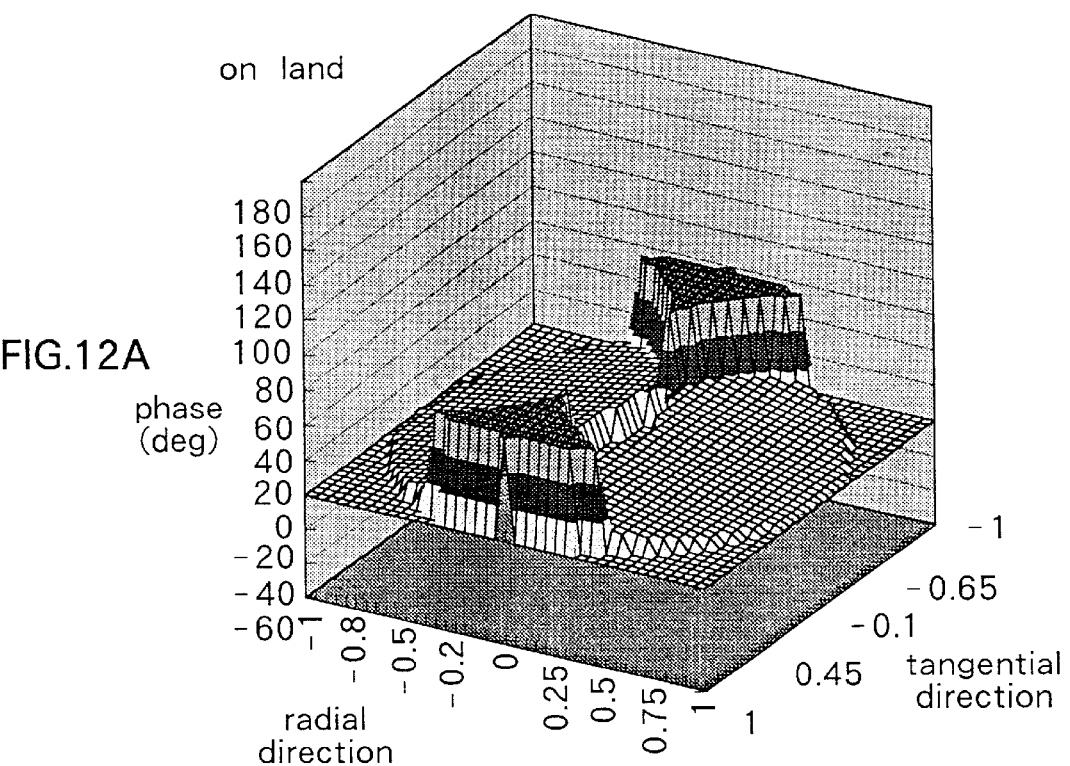
FIGS. 12A and 12B are graphs showing an example of calculation of a phase distribution on the pupil of an objective lens of disk diffraction light in the case of reproducing a DVD-RAM by an optical head for DVD having no astigmatism.
Figure 12B:
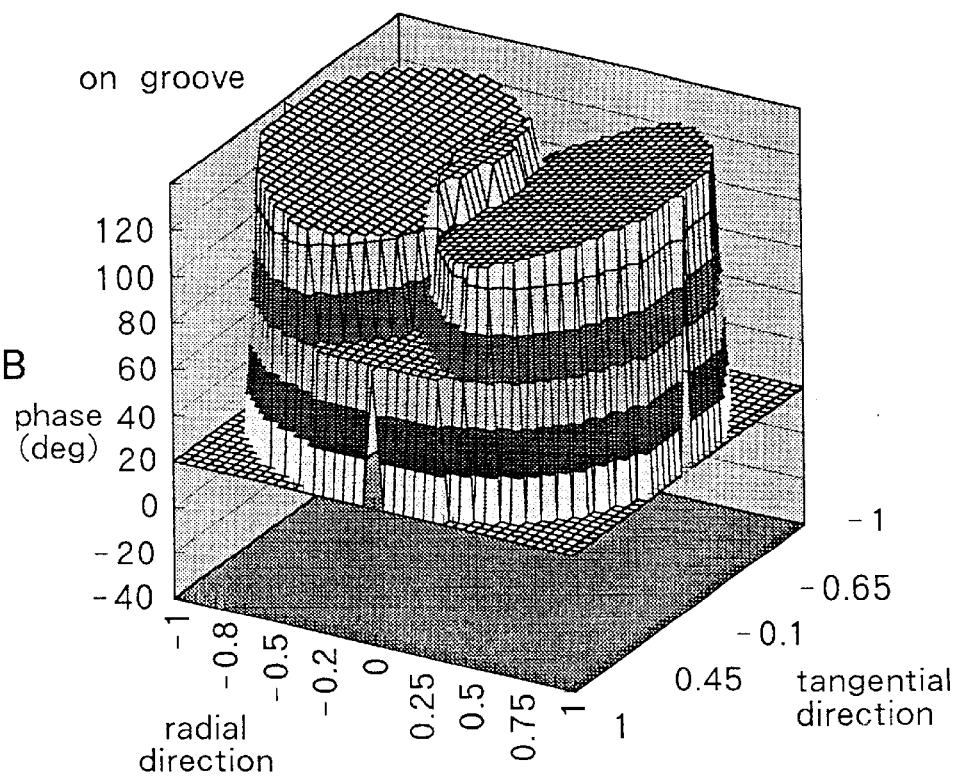

FIGS. 12A and 12B to FIGS. 14A and 14B show the calculation result of an intensity distribution and a phase distribution of the disk diffracted light on the pupil of the objective lens in the case of reproducing, for example, a DVD-RAM having a recording capacity of 4.7 GB by an optical head for DVD. Specifically, FIGS. 12A and 12B three-dimensionally show the phase distribution on the pupil of the objective lens. FIGS. 13A and 13B three-dimensionally show the intensity distribution on the pupil of the objective lens. FIGS. 14A and 14B three-dimensionally show a phase distribution obtained by fitting the intensity distribution in the same position by third-order astigmatism (and defocusing and piston). FIGS. 12A, 13A and 14A show the case where the converged light spot is on a land and FIGS. 12B, 13B and 14B show the case where the converged light spot is on a groove.

As conditions of the calculation, the following values are used. For simplicity, calculation is executed on the condition that the land and the groove have rectangular shapes having the same width. The "rim intensity" in the following conditions denotes the ratio of light intensity in the rim of the pupil to light intensity in the center of the pupil of the objective lens.

Optical head:
   wavelength of light source=660 nm
   NA of objective lens=0.60
   rim intensity in the tangential direction of a track=0.55
   rim intensity in the radial direction of a disk=0.45
Disk:
   track pitch=1.23 μm (=0.615×2)
   round-trip phase depth=λ/6

As obviously understood from FIGS. 12A and 14A and FIGS. 12B and 14B, astigmatism of opposite signs occurs due to interference in a light flux diffracted by the land and groove.

Figure 13A:
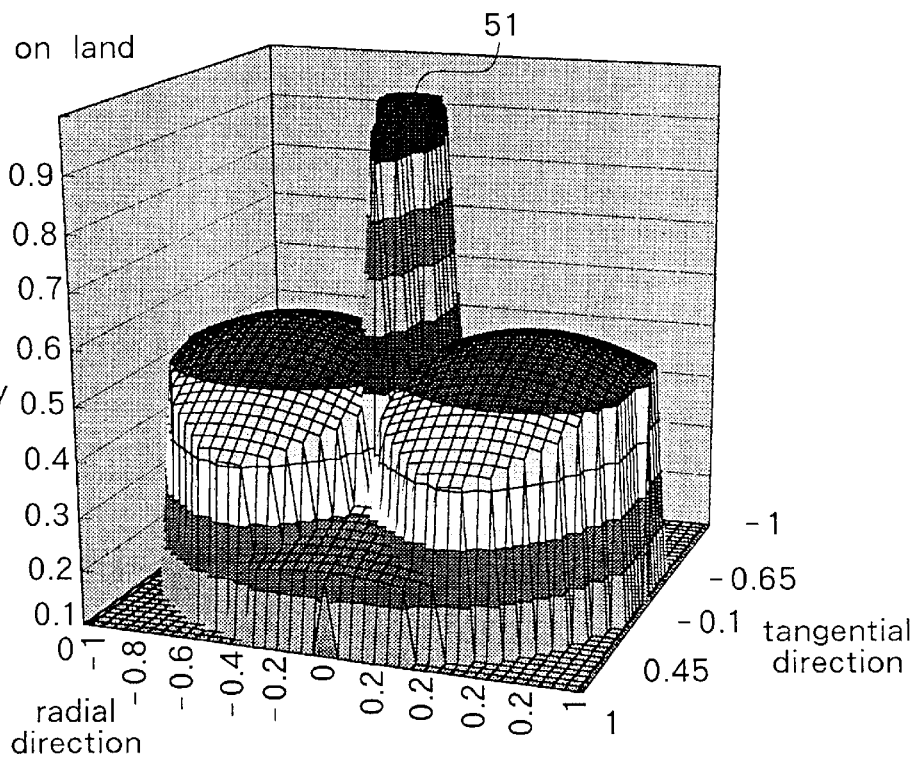
FIGS. 13A and 13B are graphs showing an example of calculation of an intensity distribution on the pupil of an objective lens of disk diffraction light in the case of reproducing a DVD-RAM by an optical head for DVD having no astigmatism.
Figure 13B:
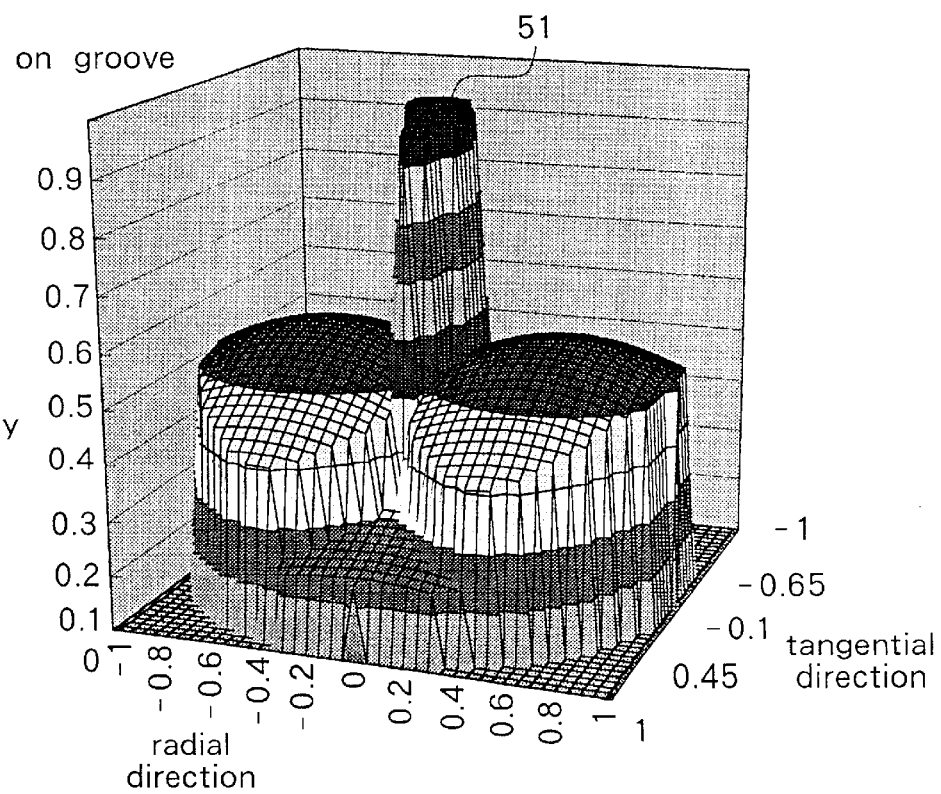

As understood from FIGS. 13A and 13B, the light intensity distribution in the case where the light converged spot is on a land and that in the case where the light converged spot is on a groove are equal to each other. The interference region 51 in which the three diffracted rays are overlapped has a particularly high intensity distribution.

The astigmatism amount by fitting is expressed by the following equation (16). When it is converted to an astigmatic difference on an optical disk in consideration of NA, the astigmatism amount in each of the case where the light is on a land and the case where the light is on a groove is estimated by the equation (17).

$$W_{L,\,G} = \pm 0.046 \,[\lambda \text{rms}] \tag{16}$$

$$\Delta L,\,G = W \times \lambda \times 4 \times 6^{1/2} / NA^2 = 0.83 \,[\mu m] \tag{17}$$

On the other hand, when it is assumed that the pull-in range of the astigmatism method is SPP and the magnification of a return system is β, in the return system, the astigmatic difference which is caused by the multilens is expressed by the following equation (18). The NA (referred to as $NA_{back}$) of the return system is expressed by the following equation (19).

$$\Delta back = SPP \times 2 \times \beta^2 \tag{18}$$

$$NA_{back} = NA/\beta \tag{19}$$

The quantity of the astigmatism caused by the multilens of the return system is expressed by the following equation (20).

$$W_{back} = \Delta back \times NA_{back}^2 / \lambda / 4 / 6^{1/2} = SPP \times NA^2 / \lambda / 2 / 6^{1/2} [\lambda \text{rms}] \tag{20}$$

For example, when it is assumed that the pull-in range SPP=6 [μm], $W_{back}$=0.67 [λrms].

Generally, in the astigmatism method, as shown in FIG. 15A, the direction D1 of the generating line of the cylindrical face of the multilens 28 at the position P1 in the return optical path is set to form 45 degrees to the arrangement direction D2 of the diffraction pattern formed by tracks (lands or grooves) of the optical disk. The astigmatism is therefore given in the direction D0 which is orthogonal to the generating line direction D1 by the multilens 28. It is assumed that the photoreceiving part 92 for the main spot (hereinbelow, simply called a photoreceiving part) of the photodetector 9 is disposed in an almost intermediate position P2 of a focus position F2 in the direction D0 to which the astigmatism is given and a focus position F1 in the direction D1 (parallel to the generating line of the cylindrical face of the multilens 28) to which the astigmatism is not given and which is orthogonal to the direction D0. In this case, the spot on the photoreceiving part becomes almost a circle at the time of focusing. The spot becomes a line in both ends of the area corresponding to the focus pull-in range SPP (FIG. 3). Consequently, the focus error signal obtained from the photodetector 9 draws an S-shaped curve with respect to the objective lens position.

When the diffraction pattern on the pupil of the objective lens and the diffraction pattern on the photoreceiving part at the time of focusing are considered, among the parallel direction and the orthogonal direction to the generating line of the cylindrical face of the multilens 28, only in the direction of focusing just before the photoreceiving face, the patterns are inverted. Consequently, a spot is formed on the photoreceiving part as shown in FIG. 15B.

As shown in FIGS. 13A and 13B, the light intensity distribution on the photoreceiving part face in the case where a spot is on a land and that in the case where a spot is on a groove are almost equal to each other. When the spot on the photoreceiving part face is as shown in FIG. 15B, even if the calculation of the astigmatism method is executed, there is no difference between the result of the calculation in the case where a spot is on a land and that in the case where a spot is on a groove.

As described above, however, in practice, a phase distribution which can be approximated by the astigmatism occurs in the return light due to the diffraction caused by the land and groove. The direction of the astigmatism obtained by synthesizing the astigmatism caused by the multilens 28 and the astigmatism caused by the land/groove diffraction does not form 45 degrees with respect to the dividing line of the photoreceiving part. The direction in the case of the land and that in the case of the groove are deviated in the opposite directions to each other by few degrees. As a result, as shown in FIGS. 16A and 16B, the interference region 51 in which the three diffracted rays are overlapped swings by few degrees over the dividing lines DL1 and DL2 in accordance with the state where the spot 196 is on a land and the state where the spot 196 is on a groove. The intensity of the interference region 51 is, as shown in FIGS. 13A and 13B, extremely high as compared with the other regions. Its behavior makes the result in the calculation by the astigmatism on the basis of an output of the photodetector 9 largely fluctuate. Specifically, a large difference occurs in the focus error signal FE between the case where the spot is on a land and the case where the spot is on a groove.

With respect to the case where the focus pull-in range is 6 μm, the rotation angles of the ±primary rays which occur as a result of the synthesis of the astigmatism by the multilens 28 and the astigmatism which is caused by the land/groove diffraction are estimated as follows.

Figure 17:
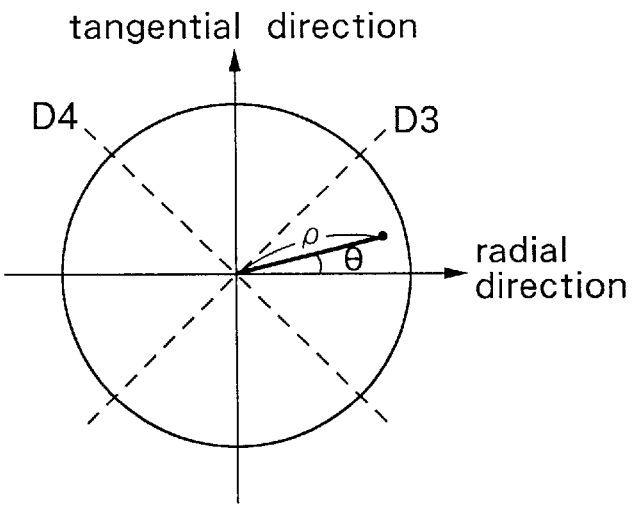
FIG. 17 is a diagram for defining the direction of an aberration.

When it is assumed that the direction of the aberration is determined and the direction of the first focusing is a direction axis D3 as shown in FIG. 17, astigmatism MAS by the multilens, astigmatism LAS caused by a land, and astigmatism GAS caused by a groove are expressed by the following equations (21) to (23), respectively, where A and B denote constants, θ denotes the direction angle in the light flux pupil cross section when the radial direction of the optical disk is used as a reference, and ρ denotes a distance from the origin in a pupil coordinate system having the optical axis as a center (in which the radius of the pupil is 1).

$$MAS = A \times \rho^2 \times \sin 2\theta \quad (21)$$

$$LAS = -B \times \rho^2 \times \cos 2\theta \quad (22)$$

$$GAS = +B \times \rho^2 \times \cos 2\theta \quad (23)$$

From the equations (21) to (23), synthetic astigmatism TAS in the case where the spot is on a land is expressed by the following equation (24). Synthetic astigmatism TAS in the case where the spot is on a groove is expressed by the following equation (25).

$$TAS = (A^2+B^2)^{1/2} \times \rho^2 \times \sin 2(\theta-\alpha/2) \quad (24)$$

$$TAS = (A^2+B^2)^{1/2} \times \rho^2 \times \sin 2(\theta+\alpha/2) \quad (25)$$

The angle α is a value which satisfies the following equations (26) and (27).

$$\cos \alpha = A/(A^2+B^2)^{1/2} \quad (26)$$

$$\sin \alpha = B/(A^2+B^2)^{1/2} \quad (27)$$

Figure 18A:
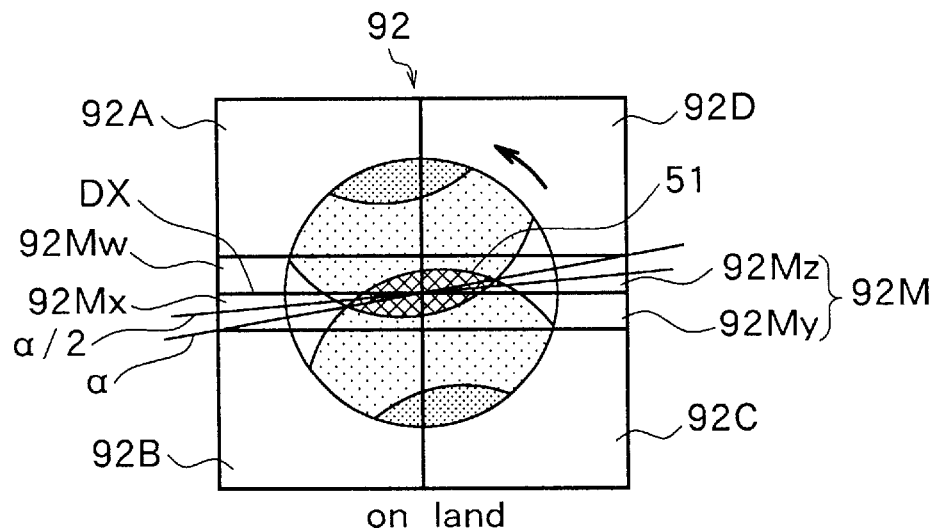
FIGS. 18A and 18B are schematic diagrams for explaining the construction of a photoreceiving part of the photodetector shown in FIG. 5, the shape of a converged spot, and the relation between the position and the direction.
Figure 18B:
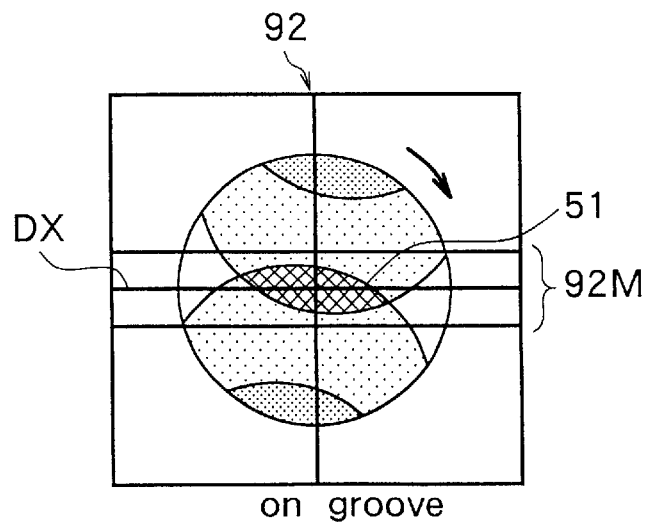

Since the diffraction pattern is inverted with respect to an area near the direction axis D4 in FIG. 17 as a center on the photoreceiving part, the arrangement direction of the diffraction pattern is turned from the original direction by 90 degrees. The direction of the inversion axis in the case where a spot is on a land is deviated from the direction axis D4 only by +α/2. The direction of the inversion axis in the case where a spot is on a groove is deviated from the direction axis D4 only by −α/2. As a result, as shown in FIGS. 18A and 18B, the interference region 51 in which the three diffraction rays are overlapped in the case where a spot is on a land and that in the case where a spot is on a groove are deviated from the dividing line DX by +α and −α, respectively.

A calculation is made by using values in practice. From A∝0.67 [λrms] and B∝0.046 [λrms], α=3.9 [deg] is obtained.

The above consideration is made on the precondition that the aberration (mainly, astigmatism) of the light beam which is condensed by the optical head onto the optical disk is not so large.

Measure against the First Cause

On the basis of the consideration, in the embodiment, on the precondition that the optical head includes little aberration, the photoreceiving part 92 for the main spot in the photodetector 9 is divided into the patterns shown in FIGS. 8 and FIGS. 18A and 18B. For example, the focus error signal FCS1 calculated by the equation (6) which does not use an output signal from the intermediate photoreceiving part 92M including the interference region 51 where the three diffraction rays are overlapped but uses only output signals from the peripheral photoreceiving parts 92A to 92D is used. That is, in FIG. 9, by setting that K1=0 and K2=0 by the setting signal SET, the focus error signal FCS1 is obtained.

Figure 19:
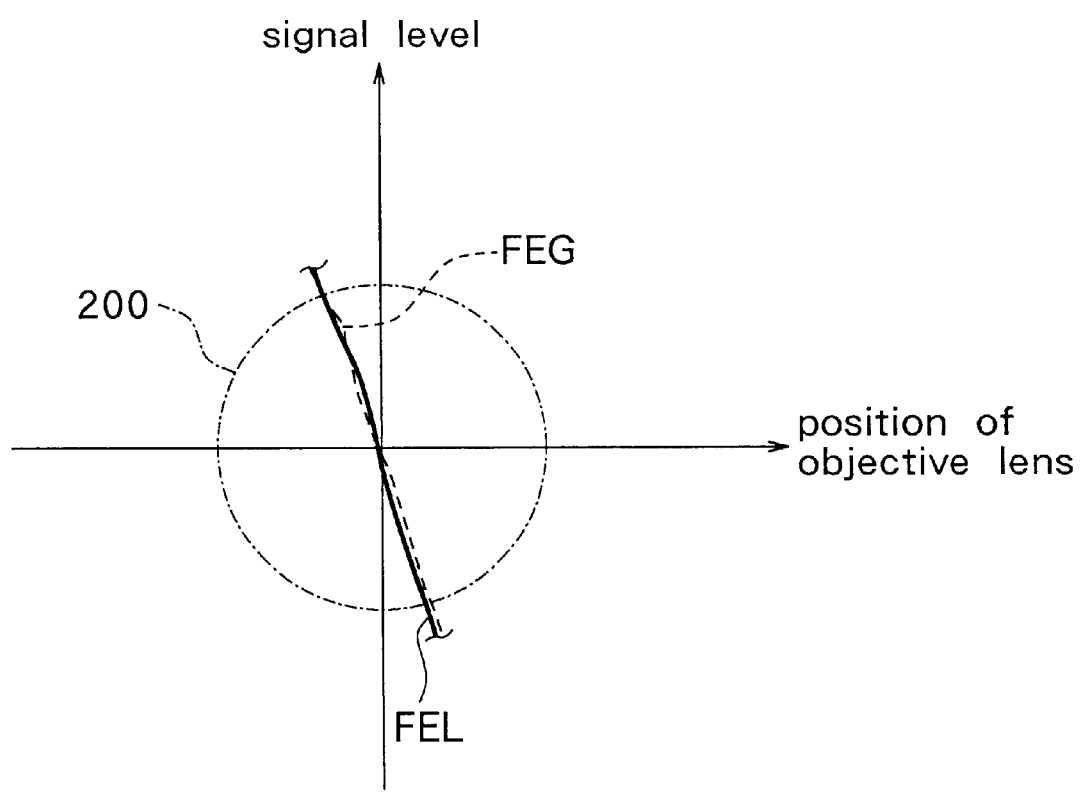
FIG. 19 is a characteristic diagram showing a focus error curve suitably obtained in the embodiment.

The focus error signal FCS1 is hardly influenced by a change in the intensity distribution of the interference region 51 in which the three diffraction rays are overlapped between the case where the spot is on a land and the case where the spot is on a groove. Consequently, an excellent focus control without "track crossing noise" can be performed. That is, as shown in FIG. 19, in an area (within a circle 200) near the position at which the level of the focus error signal becomes zero, there is no difference between the focus error signal FEL in the case where the spot is on a land and the focus error signal FEG in the case where the spot is on a groove. The position of the objective lens at which the signal level becomes zero within the focus pull-in range SPP is therefore unconditionally determined. Thus, the phenomenon such that the objective lens moves little by little each time the light beam spot is moved between a land and a groove can be suppressed.

Second Cause of Track Crossing Noise

The second cause of the "track crossing noise" will now be explained. A case in which an outgoing beam from the optical head includes astigmatism will be considered. In this case, due to asymmetry of the phase distribution caused by astigmatism, the synthetic phase distribution of the diffraction rays becomes asymmetric, so that asymmetry occurs in the intensity distribution.

Figure 20A:
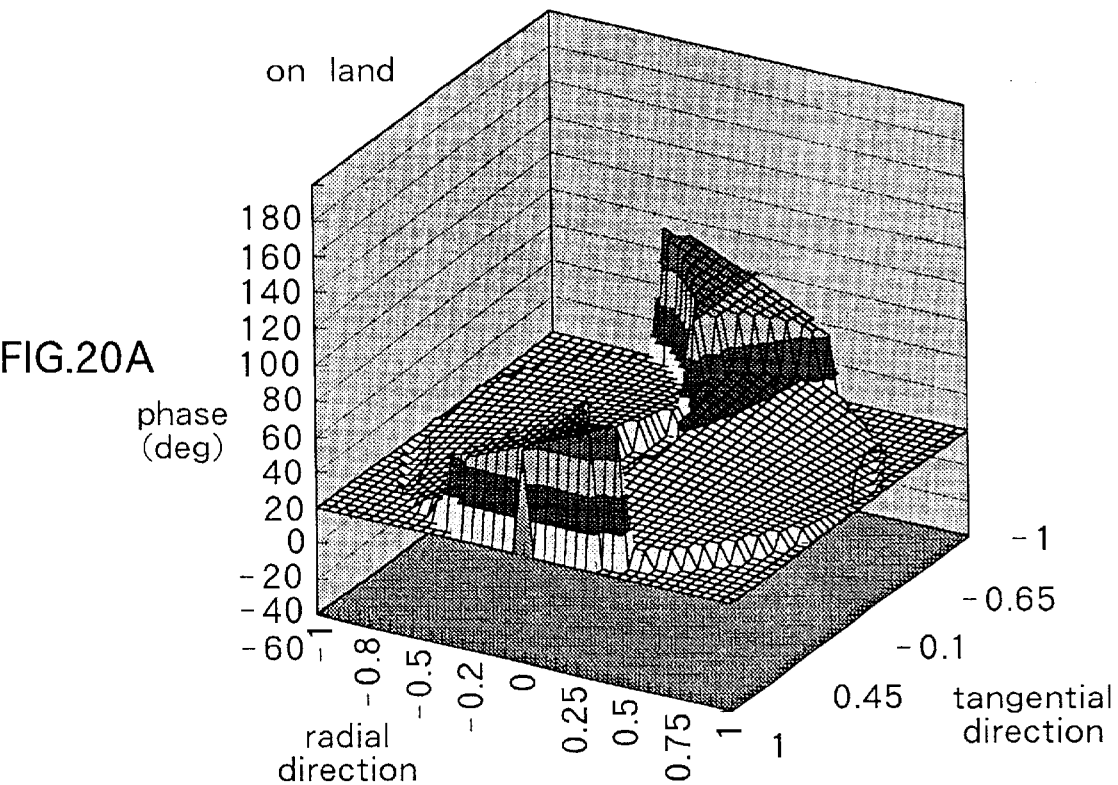
FIGS. 20A and 20B are graphs showing an example of calculation of a phase distribution on the pupil of an objective lens of disk diffraction light in the case of reproducing a DVD-RAM by an optical head for DVD having astigmatism.
Figure 20B:
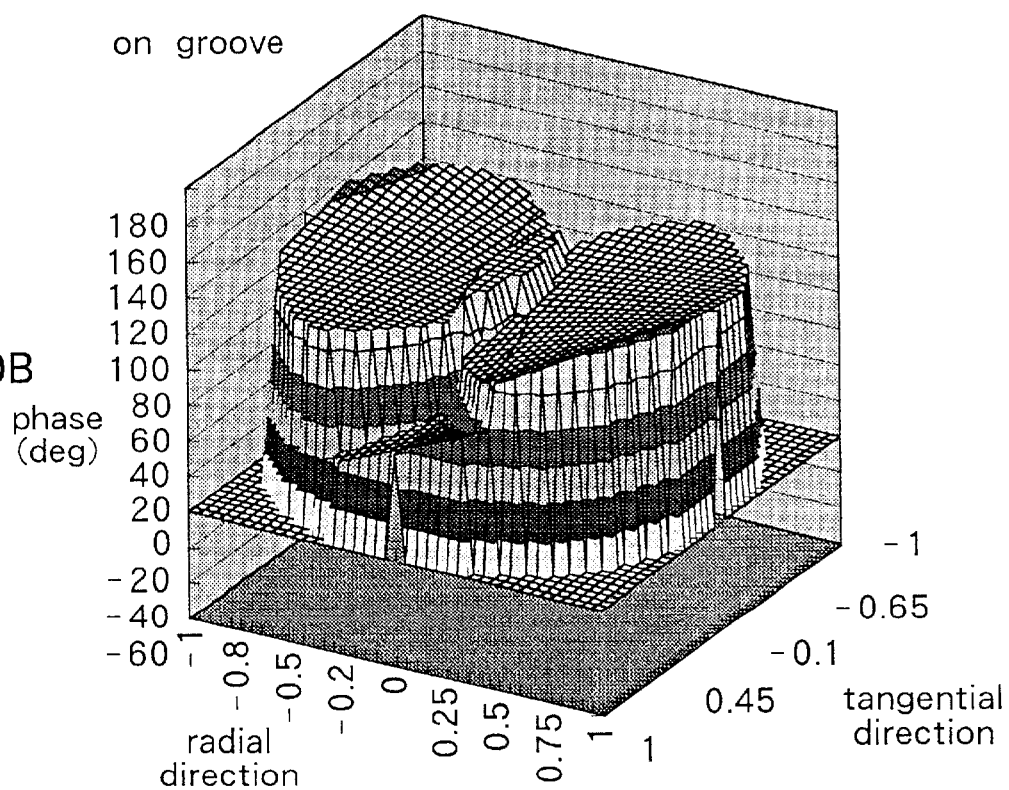
Figure 21A:
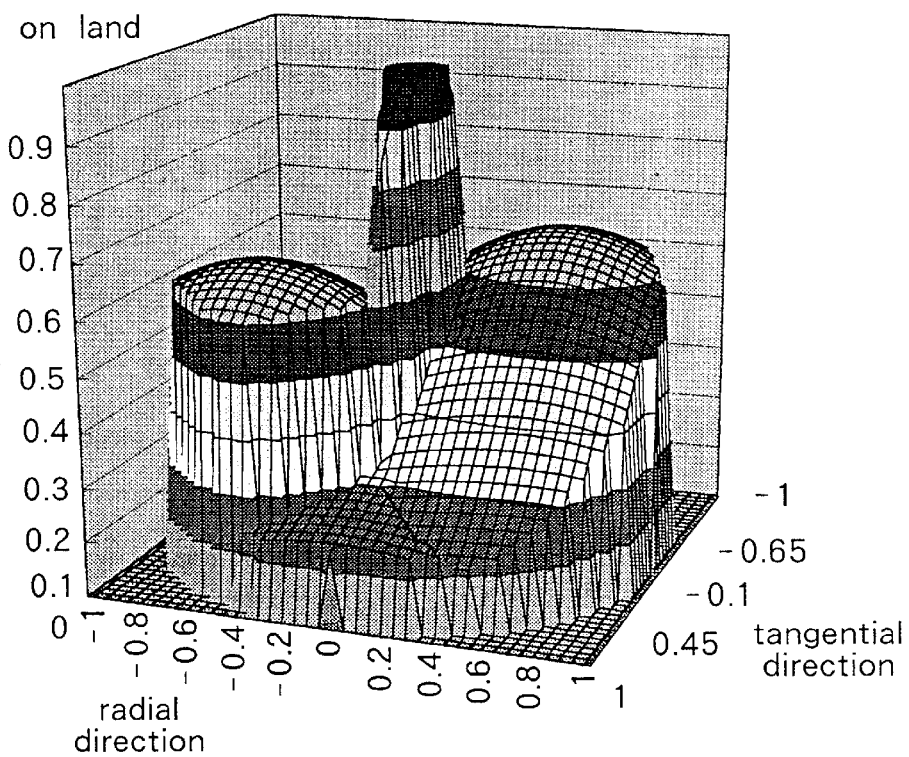
FIGS. 21A and 21B are graphs showing an example of calculation of an intensity distribution on the pupil of an objective lens of disk diffraction light in the case of reproducing a DVD-RAM by an optical head for DVD having astigmatism.
Figure 21B:
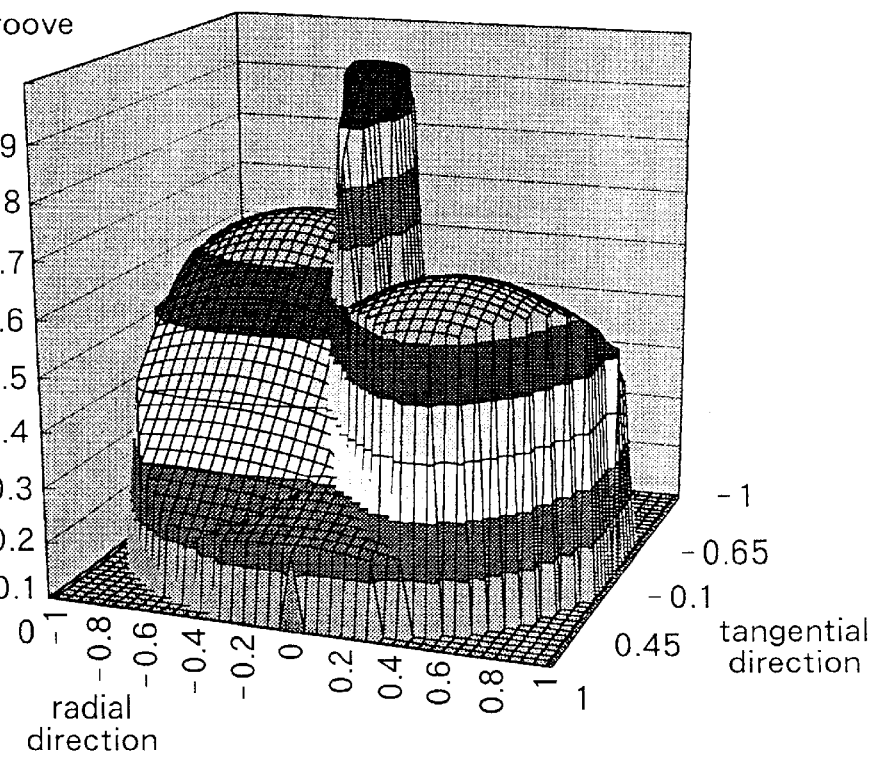

FIGS. 20A and 20B to FIGS. 22A and 22B show the calculation results of the phase distribution and the intensity distribution on the pupil of the objective lens in the case where the optical head itself has astigmatism. Specifically, FIGS. 20A and 20B three-dimensionally show the phase distribution. FIGS. 21A and 21B three-dimensionally show the intensity distribution. FIGS. 22A and 22B two-dimensionally show the intensity distribution shown in FIGS. 21A and 21B by contour lines. FIGS. 20A, 21A and 22A show the case where the converged light spot is on a land. FIGS. 20B, 21B and 22B show the case where the converged light spot is on a groove. Each of the diagrams shows the case where the direction of astigmatism forms 45 degrees with the track tangential direction. In this case, the asymmetry of the intensity distribution is the most conspicuous. It is assumed that the astigmatism quantity of the optical head itself is 0.03 [$\lambda$rms].

As understood from FIGS. 21A and 21B and FIGS. 22A and 22B, when the optical head itself has astigmatism, the intensity distribution on the photoreceiving part is asymmetric different from the case of FIGS. 13A and 13B. The "track crossing noise" caused by this changes according to the magnitude and direction of the astigmatism of the outgoing beam from the optical head. In this case, therefore, even if the focus error signal FCS1 obtained by the arithmetic equation (6) is used, the "track crossing noise" occurs in a manner similar to the conventional astigmatism method.

Measure Against the Second Cause

On the basis of the consideration, in the embodiment, attention is paid to the fact that intensity change information of the interference region 51 caused by track crossing is obtained from output signals from the small photoreceiving parts 92Mw, 92Mx, 92My and 92Mz obtained by dividing the intermediate photoreceiving part 92M in the photoreceiving part 92 for the main spot into four parts. The "track crossing noise" caused by the astigmatism of the optical head included in the focus error signal FCS1 is cancelled by the output signals from the small photoreceiving parts 92Mw, 92Mx, 92My and 92Mz. More specifically, the focusing control is performed by using the focus error signal FCS2 calculated by the equation (7). In this case, it is sufficient to use the signal FCS2 as the focus error signal FCS by setting K2=0 by the setting signal SET in FIG. 9.

In this case, even if the optical head itself includes astigmatism, the focus error signal FCS2 is hardly influenced by the ±primary rays. Consequently, an excellent focusing control without the "track crossing noise" by the second cause can be realized. In the equation (7), the coefficient K1 may be a predetermined fixed value (such as "−1"). It may be also set so that the "track crossing noise" at the time of focus-state becomes the minimum every kind of the optical head, every kind of an optical disk, or each of optical heads. The coefficient K1 may be set by selecting a proper one of a plurality of different values (discrete values) prepared or may be set so as to be adjustable to an arbitrary value in an analogue manner.

Figure 23:
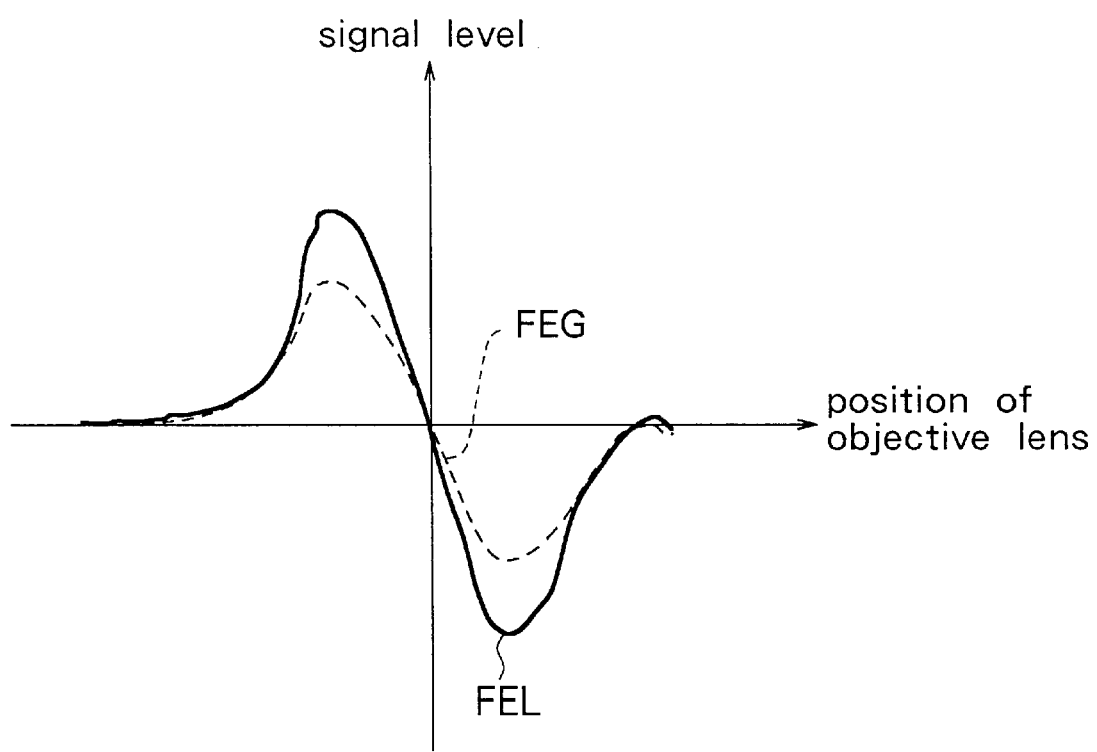
FIG. 23 is a diagram for explaining a case where the gain of a focus error signal when a spot is on a land and that when a spot is on a groove are different from each other.

Problems Caused by Gain Difference in Focus Servo and Measure Against the Problems Also in the case of using the focus error signal FCS1 and in the case of adjusting the constant K1 so that the "track crossing noise" becomes the minimum at the time of focusing in the calculation of FCS2, for example, as shown in FIG. 23, when the gain of the focus error signal in the case where the light spot is on a land and that in the case where the light spot is on a groove are different from each other, a case such that the focus control is hindered may occur. In FIG. 23, although the objective lens position so that the level of the focus error signal becomes zero is almost unconditionally determined, a large difference in inclination occurs between the focus error signal FEL in the case where the spot is on a land and the focus error signal FEG in the case where the spot is on a groove. In such a state, therefore, the optimum value of the control gain in the control of moving the objective lens varies. It becomes necessary to switch the gain.

On the basis of the consideration, in the embodiment, by adding and subtracting sums of the output signals (intermediate total sum signals) from the small photoreceiving parts 92Mw, 92Mx, 92My and 92Mz in the intermediate photoreceiving part 92M to/from the focus error signal FCS1 or FCS2, the focus error signal FCS3 or FCS4 expressed by the equations (8) and (9) is obtained, thereby enabling the gain difference between the case where the light spot is on a land and the case where the light spot is on a groove to be solved. In the following, the principle will be described.

Figure 24A:
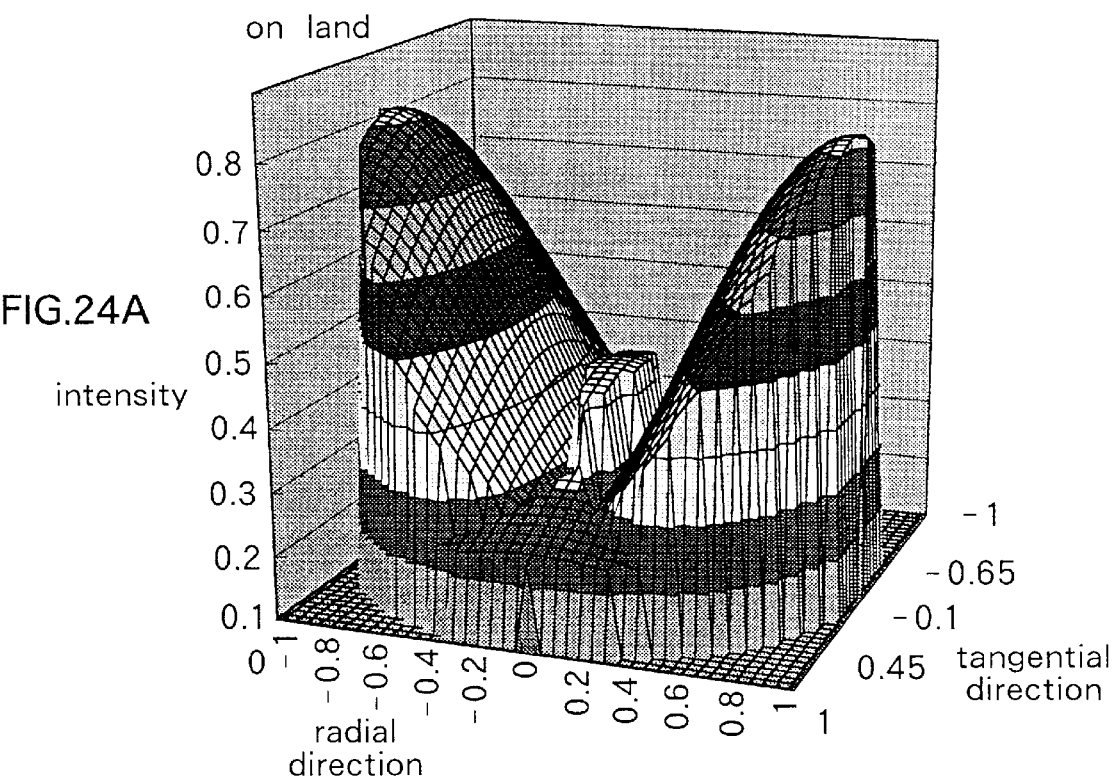
FIGS. 24A and 24B are graphs showing an example of calculation of an intensity distribution on the pupil of an objective lens of disk diffraction light in the case where an optical head for DVD for reproducing a DVD-RAM is in a defocusing state.
Figure 24B:
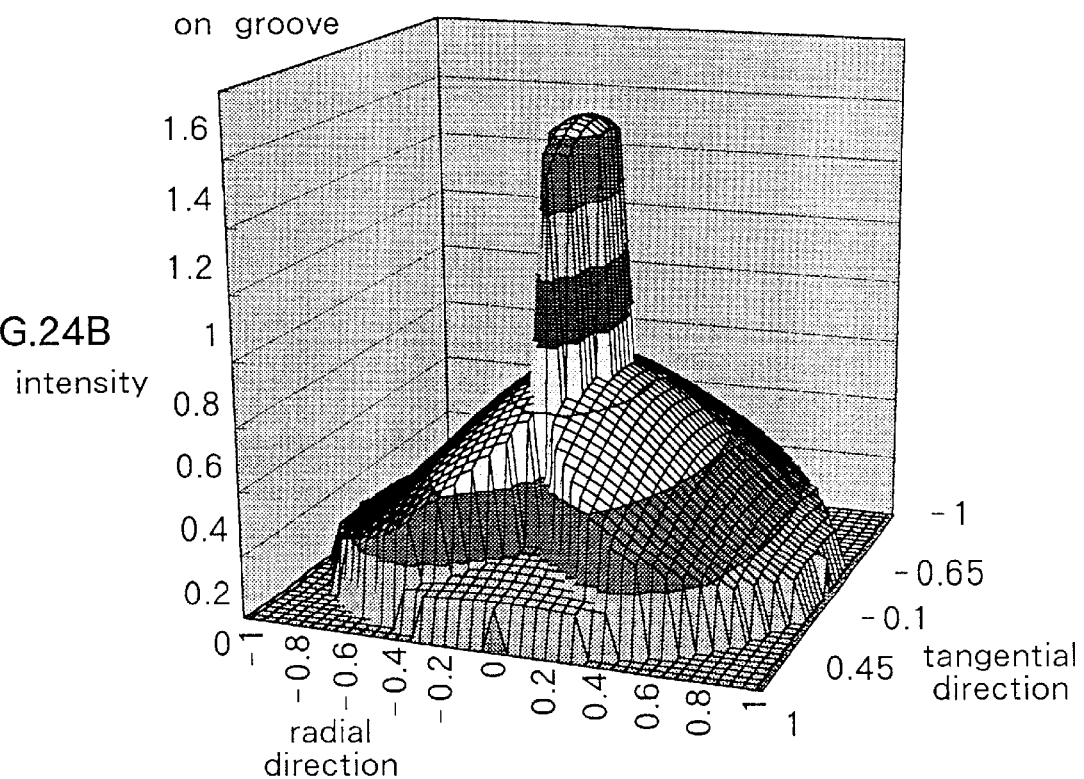
Figure 25A:
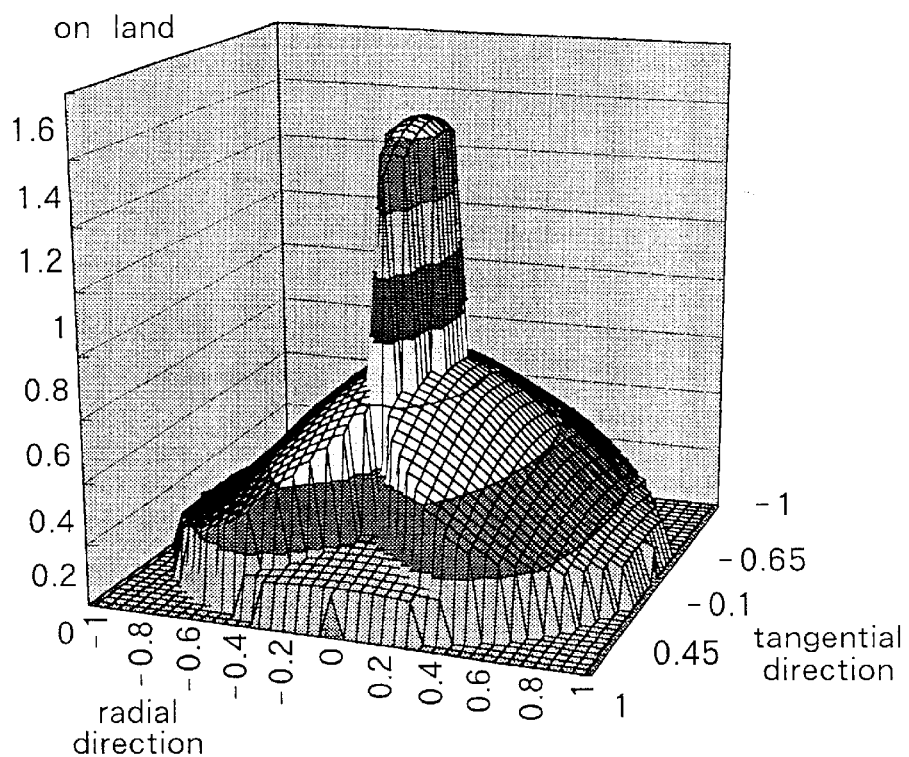
FIGS. 25A and 25B are graphs showing another example of calculation of a phase distribution on the pupil of an objective lens of disk diffraction light in the case where an optical head for DVD for reproducing a DVD-RAM is in a defocusing state.
Figure 25B:
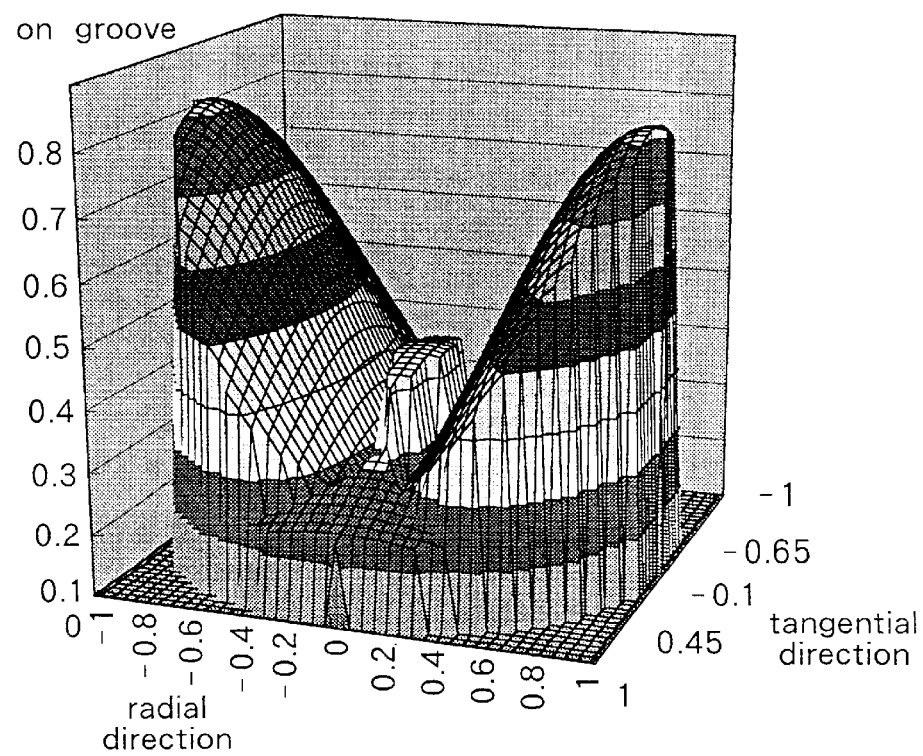

FIGS. 24A and 24B and FIGS. 25A and 25B show the results of calculation of the intensity distribution on the pupil of the objective lens in the case where a spot is on a land and that in the case where a spot is on a groove when a defocus amount is, for example, ±0.5 $\mu$m. Specifically, FIGS. 24A and 24B show the case where the defocus amount is −0.5 $\mu$m. FIGS. 25A and 25B shows the case where the defocus amount is +0.5 $\mu$m. FIGS. 24A and 25A shows the case where the spot is on a land and FIGS. 24B and 25B show the case where the spot is on a groove.

As shown in FIGS. 13A and 13B, when the defocus amount is zero, the intensity distribution in the case where the spot is on a land and that in the case where the spot is on a groove are not different from each other. On the contrary, when defocusing is given, as shown in FIGS. 24A and 24B and FIGS. 25A and 25B, the intensity distribution changes according to the defocusing direction and, particularly, the direction of a change in intensity of the interference region 51 becomes opposite. By using the signal FCS3 or FCS4 obtained by multiplying a sum of output signals from the intermediate photoreceiving part 92M corresponding to the interference region 51 by the coefficient K2 and subtracting the multiplication result from FCS1 or FCS2, the difference between the focus servo gain in the case where the spot is on a land and that in the case where the spot is on a groove can be cancelled. Thus, an excellent focus servo characteristic can be obtained. In the equations (8) and (9), it is preferable to adjust and set the coefficient K2 every optical head so that the focus error signal FCS3 or FCS4 at the time of defocusing in the case where the spot is on a land coincides with that in the case where the spot is on a groove.

The photoreceiving part pattern in the photodetector 9 used in the embodiment is similar to that in the photodetector 19 (FIG. 1) of the conventional optical head using the astigmatism for focus error detection and using the differential phase difference method and the three-beam method for tracking error detection except for only the point where the number of dividing the photoreceiving part increases. Consequently, by simply setting that K1=0 and K2=0 in the arithmetic circuit 40 shown in FIG. 9, the conventional focus error signal FE can be generated, so that it is easy to assure compatibility with a conventional system. It is also possible to preliminarily calculate the focus error signal FE and all of the focus error signals FCS1 to FCS4 according to the embodiment and select and output one of the signals by a predetermined mode switching signal in accordance with the kind or the like of an optical disk.

According to the embodiment, as described above, in place of the conventional photodetector 19, the photodetector 9 in which the dividing pattern of the photoreceiving part 92 for the main spot is different from the conventional one is used as the photodetecting means of the optical head. Without using the output signal from the intermediate photoreceiving part 92M in the photoreceiving part 92 for the main spot, a predetermined arithmetic process is performed by using only output signals from the peripheral photoreceiving parts 92A to 92D. By using the focus error signal FCS1 obtained by the arithmetic process, the focus control can be performed. Consequently, while maintaining compatibility by constructing the parts of the optical head other than the photodetector 9 in a manner similar to the case of the conventional astigmatism method, an excellent focusing control which does not cause much "track crossing noise" can be performed also to the land/groove recording medium.

According to the embodiment, when aberration is included in the optical head itself, the "track crossing noise" caused by the astigmatism of the optical head included in the focus error signal FCS1 is cancelled by the output signals from the small photoreceiving parts 92Mw, 92Mx, 92My and 92Mz, thereby the focus error signal FCS2 is obtained. The focusing control is performed by using the focus error signal FCS2. Consequently, occurrence of the "track crossing noise" caused by the aberration of the optical head itself can be suppressed and an excellent focusing control can be realized.

Further, according to the embodiment, when the focusing control is interrupted since the gain of the focus error signal in the case where a spot is on a land and that in the case where a spot is on a groove are different from each other, by adding and subtracting the sum of output signals from the small photoreceiving parts 92Mw, 92Mx, 92My and 92Mz in the intermediate photoreceiving part 92M to/from the focus error signal FCS1 or FCS2, the focus error signal FCS3 or FCS4 is obtained. The focusing control is performed by using the focus error signal FCS3 or FCS4. Consequently, a difference between the gain in the focus error signal in the case where a spot is on a land and that in the case where a spot is on a groove can be cancelled and an excellent focusing control can be realized.

According to the embodiment, the photoreceiving part pattern in the photodetector 9 is different from that in the photodetector of a conventional optical head only with respect to the point that the dividing number is increased. It is consequently extremely easy to generate the conventional focus error signal FE by the arithmetic circuit 40. Thus, the compatibility with the conventional system can be assured.

As described above, in the embodiment, any of the plurality of focus error signals FCS1 to FCS4 can be generated by the arithmetic circuit. In accordance with various conditions such as the optical performance (aberration characteristic) of the optical head and the output gain characteristic of the optical head, the focusing control can be performed by using the optimum focus error signal.

According to the embodiment, the focus error detection can be realized by using the photoreceiving part (photoreceiving part 92 for the main spot) which is as small as that in the case of the astigmatism method. Consequently, for example, even when an optical head is constructed by using the objective lens 27 (FIG. 6) having the zonal substrate thickness correcting part to assure the compatibility between the DVD and the CD, an inconvenience such that the photoreceiving part receives unnecessary diffusion light as well can be effectively prevented and signal degradation can be suppressed.

Figure 26A:
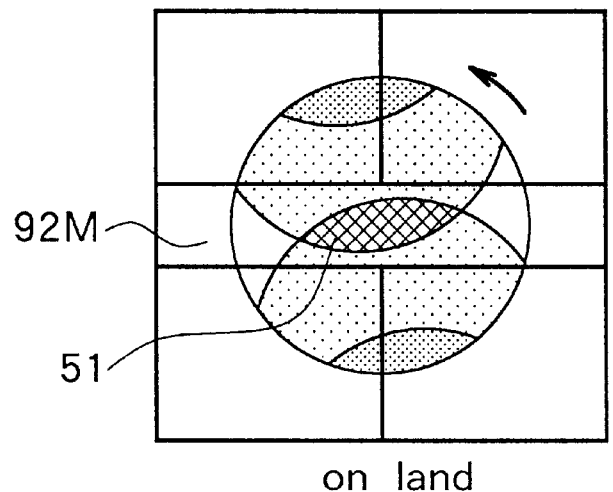
FIGS. 26A and 26B are plan views showing a modification of a photodetector.
Figure 26B:
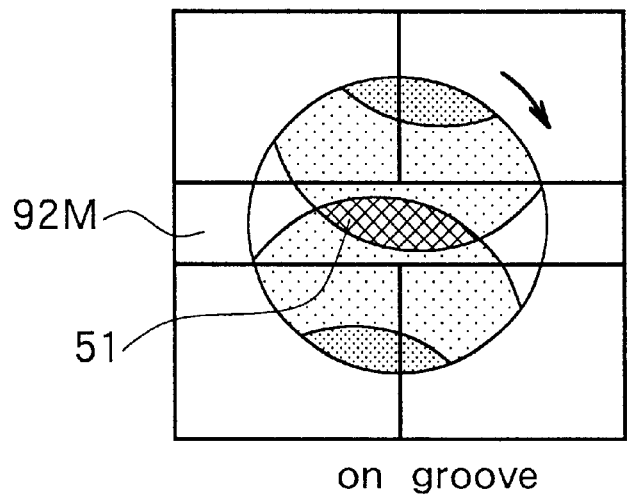

Although the embodiment has been described by the above embodiments, the invention is not limited to the embodiments but can be variously modified and applied without departing from the gist of the invention. For example, although the intermediate photoreceiving part 92M is divided into the four small photoreceiving parts 92Mw, 92Mx, 92My and 92Mz in the foregoing embodiment, the invention is not limited to the arrangement. For example, when one of the signals FCS1 and FCS3 expressed by the equations (6) and (8) is used as the focus error signal and one of the signals TRK1 and TRK3 expressed by the equations (10) and (12) is used as the tracking error signal, output signals from the small photoreceiving parts 92Mw, 92Mx, 92My and 92Mz in the intermediate photoreceiving part 92M are not necessary. In this case, therefore, the intermediate photoreceiving part 92M in the photoreceiving part 92 for the main spot is not divided into four parts but is used as a single intermediate photoreceiving part 92M as shown in FIG. 26 and it is sufficient to execute a calculation by the equation (6), (8), (10) or (12) by using an output signal from the intermediate photoreceiving part 92M.

Although the constants K1 to K3 are set to predetermined values in the embodiment, the invention is not limited to the above. For example, the constants K1 to K3 can be set to arbitrary values in accordance with the kind of an optical disk to be reproduced, the specification of an optical head used for an optical disk drive, and the like.

Although the arithmetic circuit 40 is included in the photodetector 9 in the foregoing embodiment, the arithmetic circuit 40 may be constructed as an external circuit separate from the photodetector 9.

Although the optical head in which optical parts are separately arranged has been described in the embodiment, the invention is not limited to the optical head. The invention can be also applied to an optical head constructed by integrally arranging an optical system.

An object to which the invention is applied is not limited to a DVD-RAM. The invention can be generally applied to a recording medium of a land/groove recording system in which information is recorded on both lands and grooves. Further, the invention can be also applied to a recording medium in which information is recorded on either lands or grooves as long as the medium is of a system such that three diffraction rays of the 0 order ray and ±primary rays are overlapped with each other on a recording surface. Further, the invention can be applied not only to a disc-shaped recording medium which is rotated but also to a tape-shaped recording medium or the like which is transported straight, as long as the medium is the optical recording medium of such a system.

As described above, according to the optical head or the optical information recording and reproducing apparatus of the embodiment, the optical head is constructed so that the photodetecting means for receiving reflection light from the recording medium includes: four peripheral photoreceiving parts which are almost symmetrically arranged with respect to a first axis parallel to an arrangement direction of a plurality of diffraction patterns generated by the track guiding structure of the recording medium and a second axis perpendicular to the arrangement direction; and an intermediate photoreceiving part disposed in an intermediate region sandwiched by two arrangement lines parallel to the second axis in the arrangement of the four peripheral photoreceiving parts. Consequently, separate output signals from the four peripheral photoreceiving parts and the intermediate photoreceiving part can be obtained. By using the output signals separately or selectively, the operation control of the optical head (such as focusing control) can be performed. Especially, also in the case of reproducing information from the recording medium of the land/groove recording system, by eliminating a signal which is received in an unpreferable state from a region in some of the photoreceiving parts in the photodetecting means, the influence of what is called "track crossing noise" can be eliminated and an excellent focusing control can be realized. The optical head can be obtained only by changing the photoreceiving part pattern of the photodetecting means and the processing pattern of signals obtained from the photoreceiving parts in a conventional optical head. It is therefore unnecessary to prepare new specific parts but is sufficient to slightly change conventional parts. Without vainly complicating the conventional structure, the cheap optical head and optical information recording and reproducing apparatus can be provided with a relatively simple construction.

Particularly, according to the optical head of one aspect of the embodiment, since the intermediate photoreceiving part is divided into the four small photoreceiving parts by the first and second axes, an output signal from each of the four small photoreceiving parts can be used.

According to the optical head of another aspect of the embodiment, a peripheral differential signal as a difference between a sum of signals outputted from two peripheral photoreceiving parts along one of diagonal lines in the arrangement of the four peripheral photoreceiving parts and a sum of signals outputted from two peripheral photoreceiving parts along the other diagonal line is calculated. On the basis of the calculation result, the focus state on the recording medium of light condensed by the objective lens is detected. Consequently, without being influenced by an output signal from the intermediate photoreceiving part, the focusing control by the astigmatism method can be performed.

According to the optical head of still another aspect of the embodiment, the focused state is detected on the basis of at least signals outputted from the four peripheral photoreceiving parts and signals outputted from the four small photoreceiving parts of the intermediate photoreceiving part. Thus, a large quantity of photoreceiving information can be obtained from a number of output signals. For example, by properly combining the signals, the finer accurate focusing control can be therefore performed.

According to the optical head of still another aspect of the embodiment, the peripheral differential signal as a difference between a sum of signals outputted from two peripheral photoreceiving parts along one of diagonal lines in the arrangement of the four peripheral photoreceiving parts and a sum of signals outputted from two peripheral photoreceiving parts along the other diagonal line is calculated. At least either an intermediate differential signal as a difference between a sum of signals outputted from two small photoreceiving parts along one of diagonal lines in the arrangement of the four small photoreceiving parts in the intermediate photoreceiving part and a sum of signals outputted from two small photoreceiving parts along the other diagonal line or an intermediate total sum signal as a total sum of signals outputted from the four small photoreceiving parts of the intermediate photoreceiving part is calculated. The focused state is detected on the basis of an addition result obtained by adding at least one of constant times of the intermediate differential signal or constant times of the intermediate total sum signal to the peripheral differential signal. Consequently, the focusing control in which the intermediate differential signal and the intermediate total sum signal as elements other than the peripheral differential signal are also considered can be performed. By properly setting the constant by which the intermediate differential signal and the intermediate total sum signal is multiplied, the more accurate focusing control can be performed.

According to the optical head of still another aspect of the embodiment, since a constant by which the detection signal outputted from the intermediate photoreceiving part is multiplied in the arithmetic means can be set arbitrarily, optimization of the focusing control is facilitated.

According to the optical head of still another aspect of the embodiment, a constant by which a detection signal outputted from the intermediate photoreceiving part is multiplied in the arithmetic means can be either selected from a plurality of predetermined values in accordance with at least either the kind of a recording medium or the kind of an optical head or adjusted to a value which almost minimizes a fluctuation in the focus error signal which occurs when the light beam condensed by the objective lens crosses the track guiding structure. Thus, the proper focusing control can be always performed in accordance with the kind of the recording medium, the kind of the optical head, or the like.

According to the photodetector of the embodiment, it comprises the four peripheral photoreceiving parts and the intermediate photoreceiving part and output signals from the four peripheral photoreceiving parts and the intermediate photoreceiving part are switched in accordance with the switching signal supplied. Thus, the method of detecting a focus error which occurs when a light beam emitted from a light source is condensed by an objective lens onto a recording medium having a predetermined track guiding structure can be properly changed.

According to the focus error detecting method of the embodiment, the photodetecting means is provided with the four peripheral photoreceiving parts and the intermediate photoreceiving part, and a focus error signal is obtained by adding a detection signal obtained on the basis of signals outputted from the four peripheral photoreceiving parts and constant times of a detection signal obtained on the basis of signals outputted from the intermediate photoreceiving part. The photoreceiving information can be consequently obtained not only from the four peripheral photoreceiving parts but also from the intermediate photoreceiving part. For example, therefore, by properly combining the signals or properly setting the constant, the more accurate focusing control can be realized.

Particularly, according to the focus error detecting method of one aspect of the embodiment, the intermediate photoreceiving part is divided into four small photoreceiving parts by the first and second axes and a detection signal to be multiplied by the constant obtained on the basis of signals outputted from the four small photoreceiving parts of the intermediate photoreceiving part. Thus, the photoreceiving state of the intermediate photoreceiving part can be more specifically known.

While the invention has been described with reference to specific embodiment chosen for purpose of illustration, it should be apparent that numerous modifications could be made there to by those skilled in the art without departing from the basic concept and scope of the invention.

What is claimed is:

1. An optical head, comprising:
   a light source for emitting a light beam;
   an objective lens for condensing the light beam emitted from the light source onto a recording surface of a recording medium having a predetermined track guiding structure;

light splitting means for splitting the light beam emitted from the light source and a light beam reflected by the recording surface of the recording medium from each other;

photodetecting means for receiving the light beam reflected by the recording medium and split by the light splitting means; and astigmatism causing means for causing astigmatism in the light beam reflected by the recording surface of the recording medium and coming to the photodetecting means via the light splitting means, wherein the photodetecting means includes at least three photoreceiving areas, at least one of said photoreceiving areas comprising:

four peripheral photoreceiving parts which are almost symmetrically arranged with respect to a first axis parallel to an arrangement direction of a plurality of diffraction patterns generated by the track guiding structure of the recording medium and a second axis perpendicular to the arrangement direction; and an intermediate photoreceiving part disposed in an intermediate region sandwiched by two arrangement lines parallel to the second axis in the arrangement of the four peripheral photoreceiving parts, wherein the intermediate photoreceiving part is divided into four small photoreceiving parts by the first and second axes.

2. An optical head according to claim 1, further comprising:

focus detecting means for detecting a focused state of a light beam condensed by the objective lens onto the recording medium on the basis of at least signals outputted from the four peripheral photoreceiving parts.

3. An optical head according to claim 2, wherein the focus detecting means performs a calculation of a peripheral differential signal which is a difference between a sum of signals outputted from two peripheral photoreceiving parts along one of diagonal lines in the arrangement of the four peripheral photoreceiving parts and a sum of signals outputted from two peripheral photoreceiving parts along the other diagonal line, and detects the focused state on the basis of a result of the calculation.

4. An optical head according to claim 1, further comprising:

focus detecting means for detecting the focused state on the basis of at least signals outputted from the four peripheral photoreceiving parts and signals outputted from the four small photoreceiving parts of the intermediate photoreceiving part.

5. An optical head according to claim 4, wherein the focus detecting means performs a calculation of a peripheral differential signal which is a difference between a sum of signals outputted from two peripheral photoreceiving parts along one of diagonal lines in the arrangement of the four peripheral photoreceiving parts and a sum of signals outputted from two peripheral photoreceiving parts along the other diagonal line, calculates at least either an intermediate differential signal as a difference between a sum of signals outputted from two small photoreceiving parts along one of diagonal lines in the arrangement of the four small photoreceiving parts in the intermediate photoreceiving part and a sum of signals outputted from two small photoreceiving parts along the other diagonal line or an intermediate total sum signal as a total sum of signals outputted from the four small photoreceiving parts of the intermediate photoreceiving part, and detects the focused state on the basis of an addition result obtained by adding at least either constant times of the intermediate differential signal or constant times of the intermediate total sum signal to the peripheral differential signal.

6. An optical head according to claim 1, further comprising:

arithmetic means for obtaining a focus error signal by adding a detection signal obtained on the basis of signals outputted from the four peripheral photoreceiving parts and constant times of a detection signal on the basis of signals outputted from the intermediate photoreceiving part; and an objective lens driving mechanism for moving the objective lens in the optical axis direction of the objective lens on the basis of the focus error signal obtained by the arithmetic means.

7. An optical head according to claim 6, wherein the arithmetic means comprises coefficient setting means for arbitrarily setting a constant multiplied by the detection signal outputted from the intermediate photoreceiving part.

8. An optical head according to claim 7, wherein the constant multiplied by the detection signal outputted from the intermediate photoreceiving part in the coefficient setting means can be selected among a plurality of predetermined values in accordance with at least either the kind of recording medium or the kind of an optical head.

9. An optical head according to claim 7, wherein the constant multiplied by the detection signal outputted from the intermediate photoreceiving part in the coefficient setting means is a value, which is minimized a fluctuation in the focus error signal occurring when the light beam condensed by the objective lens crosses the track guiding structure.

10. A photodetector for detecting a focus error which occurs when a light beam emitted from a light source is condensed on a recording medium having a predetermined track guiding structure by an objective lens, comprising:

at least three photoreceiving areas operable to receive light reflected from said recording medium, at least one of said photoreceiving areas including four peripheral photoreceiving parts which are almost symmetrically arranged with respect to a first axis which is parallel to an arrangement direction of a plurality of diffraction patterns which are generated by the track guiding structure of the recording medium and a second axis which is perpendicular to the arrangement direction; and an intermediate photoreceiving part disposed in an intermediate region sandwiched by two arrangement lines parallel to the second axis in the arrangement of the four peripheral photoreceiving parts, wherein the intermediate photoreceiving part is divided into four small photoreceiving parts by the first and second axes;

an input terminal for inputting a switching signal; and switching means for switching output signals from the four peripheral photoreceiving parts and the intermediate photoreceiving part in response to the switching signal supplied from the input terminal.

11. An optical information recording and reproducing apparatus for optically performing at least either recordation or reproduction of information to/from a recording medium, comprising:

recording medium driving means for driving the recording medium;

an optical head for reading a signal from the recording medium driven by the recording medium driving means;

optical head driving means for moving the optical head along the recording medium;

signal processing means for generating a reproduction signal on the basis of the signal read by the optical head; and servo control means for controlling operations of the recording medium driving means, the optical head driving means and the optical head on the basis of the signal read by the optical head, wherein the optical head has:
  a light source for emitting a light beam;
  an objective lens for condensing the light beam emitted from the light source onto a recording surface of a recording medium having a predetermined track guiding structure;
  light splitting means for splitting the light beam emitted from the light source and a light beam reflected by the recording surface of the recording medium from each other;
  photodetecting means for receiving the light beam reflected by the recording medium and split by the light splitting means, which has at least three photoreceiving areas, at least one of said photoreceiving areas comprising four peripheral photoreceiving parts almost symmetrically arranged with respect to a first axis parallel to an arrangement direction of a plurality of diffraction patterns generated by the track guiding structure of the recording medium and a second axis perpendicular to the arrangement direction, and an intermediate photoreceiving part disposed in an intermediate region sandwiched by two arrangement lines parallel to the second axis in the arrangement of the four peripheral photoreceiving parts, wherein the intermediate photoreceiving part is divided into four small photoreceiving parts by the first and second axes; and
  astigmatism causing means for causing astigmatism in the light beam reflected by the recording surface of the recording medium and coming to the photodetecting means via the light splitting means.

12. A focus error detecting method used for an optical head having: a light source for emitting a light beam; an objective lens for condensing the light-beam emitted from the light source onto a recording surface of a recording medium having a predetermined track guiding structure; light splitting means for splitting the light beam emitted from the light source and a light beam reflected by the recording surface of the recording medium from each other; photodetecting means for receiving the light beam reflected by the recording medium and split by the light splitting means; and astigmatism causing means for causing astigmatism in the light beam reflected by the recording surface of the recording medium and coming to the photodetecting means via the light splitting means, wherein the photodetecting means is equipped with at least three photoreceiving areas, at least on of said photoreceiving areas comprising: four peripheral photoreceiving parts which are almost symmetrically arranged with respect to a first axis parallel to an arrangement direction of a plurality of diffraction patterns generated by the track guiding structure of the recording medium and a second axis perpendicular to the arrangement direction; and an intermediate photoreceiving part disposed in an intermediate region sandwiched by two arrangement lines parallel to the second axis in the arrangement of the four peripheral photoreceiving parts, wherein the intermediate photoreceiving part is divided into four small photoreceiving parts by the first and second axes, and a focus error signal is obtained by adding a detection signal obtained on the basis of signals outputted from the four peripheral photoreceiving parts and constant times of a detection signal obtained on the basis of signals outputted from the intermediate photoreceiving part.

13. A focus error detecting method according to claim 12, wherein the detection signal to be multiplied by the constant is obtained on the basis of signals outputted from the four small photoreceiving parts of the intermediate photoreceiving part.

* * * * *